United States Patent [19]
Rolle et al.

[11] Patent Number: 6,165,525
[45] Date of Patent: *Dec. 26, 2000

[54] FOOD COOKING SYSTEM WITH ULTRASONIC ROTATIONAL BASKET

[75] Inventors: Reno Rolle, 6010 Greatwood Ter., Alpharetta, Ga. 30005; Christopher M. Goggin, Wilmington, N.C.; Mark M. Laisure, Tampa, Fla.

[73] Assignee: Reno Rolle, Alpharetta, Ga.

[*] Notice: This patent is subject to a terminal disclaimer.

[21] Appl. No.: 09/406,817

[22] Filed: Sep. 28, 1999

Related U.S. Application Data

[63] Continuation-in-part of application No. 09/133,486, Aug. 12, 1998, Pat. No. 5,993,872.

[51] Int. Cl.[7] ............................... A21D 6/00; A23L 1/00; A47J 37/12

[52] U.S. Cl. ...................... 426/238; 426/438; 99/409; 99/410

[58] Field of Search ..................... 426/238, 438; 99/409, 410, 407, 330, 336

[56] References Cited

U.S. PATENT DOCUMENTS

| | | | |
|---|---|---|---|
| 2,568,792 | 9/1951 | Cripps | 99/335 |
| 3,200,737 | 8/1965 | Ferenc | 99/355 |
| 3,846,565 | 11/1974 | Rosenberg et al. | 426/238 |
| 4,622,231 | 11/1986 | Swartky | 426/438 |
| 5,027,697 | 7/1991 | De Longhi | 99/409 |
| 5,275,092 | 1/1994 | Fauteux | 99/407 |
| 5,275,093 | 1/1994 | Chiu | 99/408 |
| 5,520,099 | 5/1996 | Chung | 99/409 |
| 5,586,486 | 12/1996 | Nitschke et al. | 99/330 |
| 5,611,265 | 3/1997 | Ronci et al. | 99/353 |

*Primary Examiner*—Nina Bhat
*Attorney, Agent, or Firm*—Piper Marbury Rudnick & Wolfe, LLP; Cynthia K. Nicholson

[57] ABSTRACT

A food cooking apparatus is provided. It includes a first container, and a second container connected to the first container with a passage defined therebetween and communicating with the first container. An ultrasonically tuned basket is rotatably mounted in the first chamber. The first and second containers are pivotally mounted together, and pivot between a first, vertical position and a second, tilted position, causing a heated cooking liquid to flow from the second container to the first container. The basket is rotated in the first container for a predefined period of time. The first and second container are returned to the vertical position, while the basket is provided with an ultrasonic vibrating motion, in order to reduce the amount of fat in the food. Further, a method of ultrasonically removing cooking liquid from food is provided. An ultrasonically tuned flexible membrane, onto which food may be placed, is provided. The flexible membrane is ultrasonically driven the flexible membrane in a first direction; and the flexible membrane rotated about an axis.

13 Claims, 19 Drawing Sheets

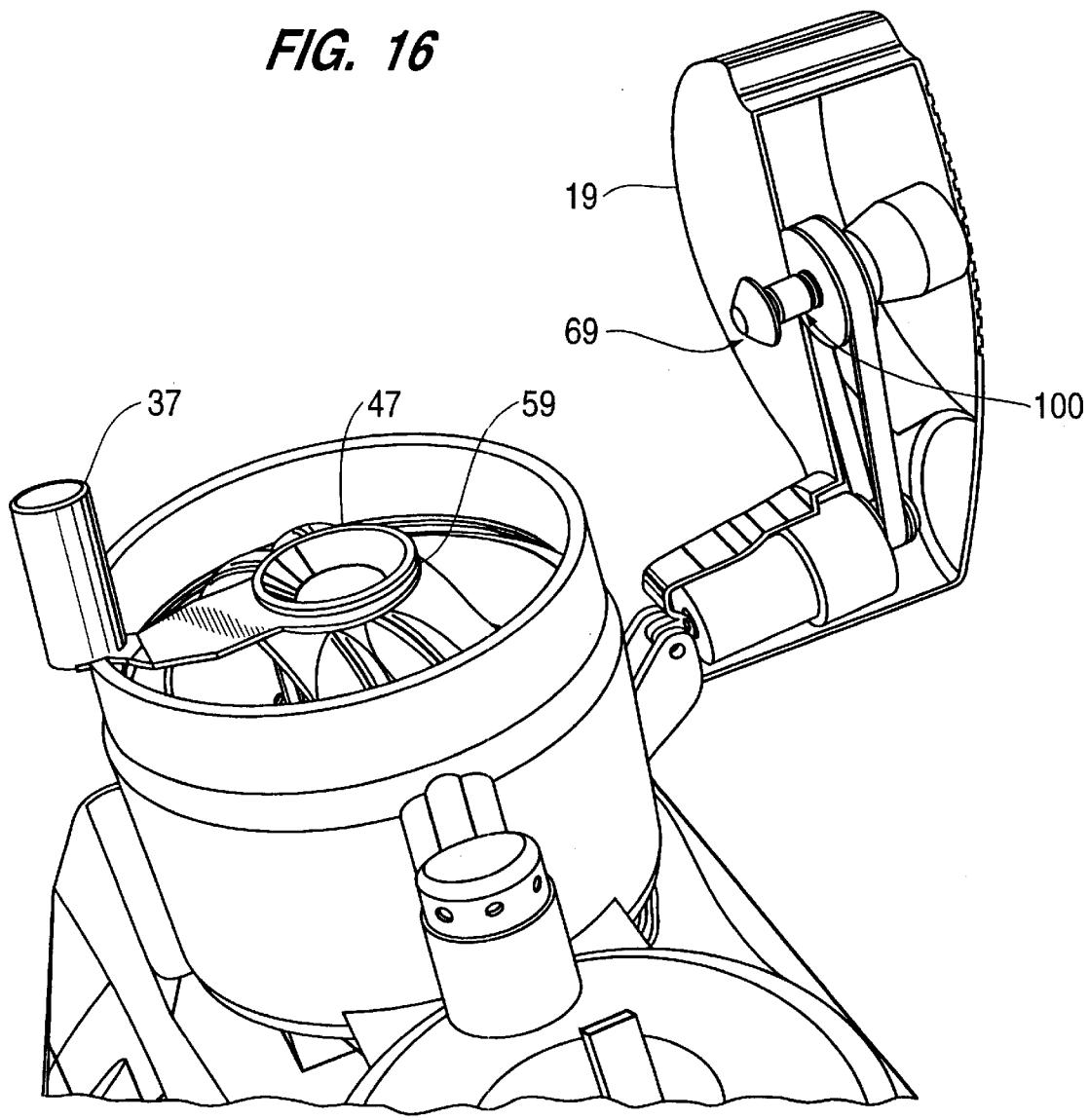

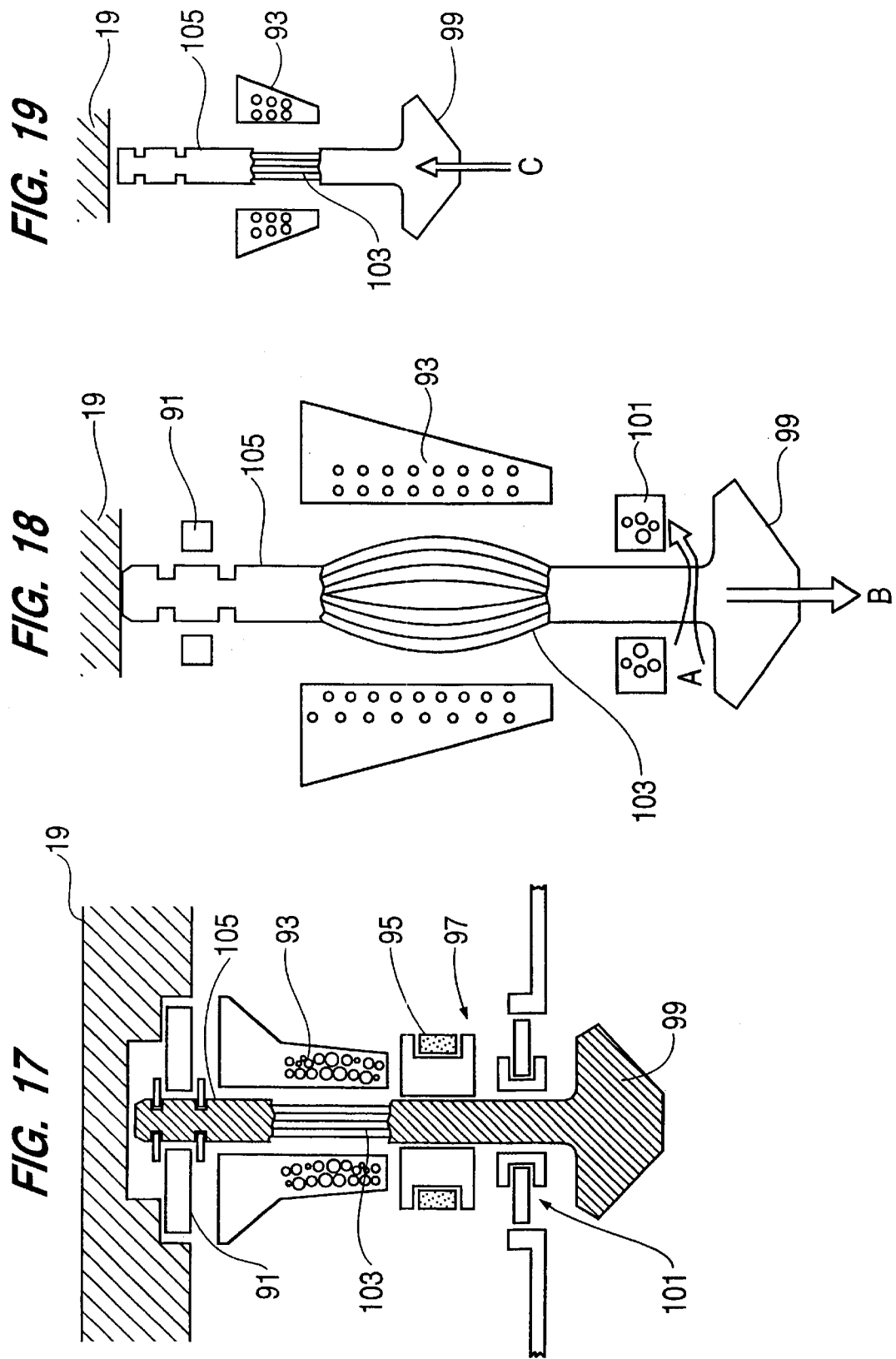

FOOD COOKING SYSTEM WITH ULTRASONIC ROTATIONAL BASKET

This is a continuation-in-part of application Ser. No. 09/133,486, filed Aug. 12, 1998 now U.S. Pat. No. 5,993,872.

BACKGROUND OF THE INVENTION

1. Field of the Invention

The present invention relates to a food cooking system and method which is particularly adapted for frying various pieces of food in such a manner so as to remove fat or oil from the fried food. In particular, the oil and fat removal system includes a gravity feed cooking container and an ultrasonic rotational basket which is rotated and in which the food is ultrasonically treated to reduce excess fat and oil from the food; and the method includes ultrasonic treatment of food to reduce excess fat and oil.

One traditional method of cooking food involves frying the pieces in hot oil. This is a popular method of cooking, however, the oil adds undesirable calories and unhealthy fat to the food. Moreover, the process of frying the food involves heated oil which can be messy and frequently generates undesirable cooking odors. Another disadvantage of traditional frying methods is that it can be time consuming to clean the equipment used for the frying.

Moreover, in deep fat frying food, the temperature can be critical in obtaining sufficiently crisp food which is not over or under fried. The cooking time also must be measured accurately. In addition, following the traditional deep fat frying method, the food benefits from additional draining, during which time the food may become overly cool.

Many attempts have been made to remedy some or all of these problems. For example, U.S. Pat. No. 5,275,093, Chiu, discloses food processing equipment which charges oil into a frying tank as one of several processing steps. A vacuum state is created in the frying tank, and oil from an oil reservoir is led through a heating means into the frying tank. A food basket is shaken by being pneumatically vibrated up and down and rotated, in order to evenly fry the food. Once the food is fried, the frying oil in the tank is re-collected into the oil reservoir via a filter. Chiu utilizes the shaking motion of the food basket in a vacuumized state to avoid directly frying the food. Steam heating and other aspects of Chiu's complicated device are undesirable and still do not solve the need for a cooking system which is easily cleaned, provides a traditional fried flavor, but reduces the calories.

U.S. Pat. No. 5,611,265, Ronci et al., and U.S. Pat. No. 2,568,792, Cripps, each disclose a cooking apparatus which has a rotating cooking basket to help spin out unwanted oil from the food. Ronci discloses a combination fryer and charbroiler food cooking apparatus, in which a cooking basket is lowered into a cooking chamber with the hot oil. When the food is cooked, the basket is moved to an upper spinning position, in which the basket rotates about its shaft and spins out the oil and grease. Cripps discloses a vertically movable and rotatable basket, which can be elevated from a lower cooking position to an upper position in which the basket is rotated to extract excess fluid, water or fat from the cooked food.

Although both of these involve a traditional method of frying the food, they do not avoid the traditional problems of measuring temperature and cooking time, they do not simplify cleaning of the cooking apparatus or remove the undesirable cooking odors. Moreover, simply rotating the basket, although an improved method, still does not sufficiently eliminate extra fat from the food. U.S. Pat. No. 3,200,737, Ferenc, also discloses a cooking utensil using a rotating cooking basket. Here, a manually operated crank rotates the basket around a shaft, causing the frying liquid to be thrown off of the food. The Ferenc cooking utensil has the disadvantages similar to those of Ronci and Cripps.

Self contained frying machines have been attempted, to automate the control of temperature and of cooking time. For example, U.S. Pat. No. 5,605,091, Garber, discloses a self contained frying machine, which shakes a food basket to drain excess fat. Garber merely automates the manual process of placing french fries into a frying basket, placing the basket into a chamber with properly heated cooking oil, removing the frying basket from the cooking oil, and shaking the frying basket. Garber still has many of the disabilities of the traditional food frying systems.

Other attempts to improve the traditional method of food frying are shown, for example, in the U.S. Pat. No. 5,027,697, De Longhi, which has a deep fryer and a rotating basket, in which the basket is inclined into the oil bath. U.S. Pat. No. 5,586,486, Nitschke et al., discloses an automated deep frying system which includes a food storage compartment, a cooking chamber, and an oil replenishment chamber.

Although the art shows spinning food baskets, or baskets with vertical movement, conventional devices do not maintain the traditional fried taste of the food while sufficiently reducing extra fat and calories. Many of these systems still have the problem that they are messy and do not reduce objectionable food cooking odors. The complexity of some of these systems makes them difficult to clean. Moreover, the non-automated systems still permit errors since they do not automate the measuring of cooking time and cooking temperature. Alternatively, some of these systems simply automate the traditional manual method of frying food, without eliminating the other problems of conventional methods.

Therefore, there remains a distinct need for a food frying system and method which reduces extra fat and undesirable calories, while retaining the traditional fried or cooked food flavor. There still remains a need for a food cooking system and method which is less messy and more efficiently reduces objectionable cooking odors. In spite of the available systems, there still remains a need for a system and method which is useful in home and industry, but which is relatively straightforward and easy to clean. Also, conventional systems fail to solve the need for a food cooking system which is more accurate in measuring temperature and cooking time.

SUMMARY OF THE INVENTION

Therefore, one object of the present invention is to provide a food cooking device and method which can provide food with a traditional flavor while reducing undesirable fat and extra calories. A feature of the present invention is that is provides an ultrasonic, rotatable basket, which extracts excess oil, fluid or water from the cooked food; and that it provides for ultrasonic removal of excess oil, fluid or water from cooked food. Another object of the present invention is to provide an easily cleaned, self contained cooking device which additionally reduces objectionable cooking odors. A feature of the present invention is that the device may be self contained and include a vent with a filter for odors.

Another object of the present invention is to provide a food cooking device which is relatively straight-forward and easy to clean. A feature of the present invention is that it may be cleaned by running cleaning fluid and/or water through the cooking cycle after cooking is completed.

A further object of the present invention is to reduce inaccuracies in measuring temperature and cooking time by automating the cooking process.

Other objects, advantages and features of the present invention will be understood from the drawings and detailed description of the preferred embodiments, which follow.

In accordance with the foregoing objects and advantages, there is provided a food cooking apparatus. There is provided a first container. A second container is connected to the first container, with a passage defined therebetween and communicating with the first container. A basket is rotatably mounted in the first chamber, and has a vertical, ultrasonic vibrating motion. The first and second containers are pivotally mounted on a housing surrounding the containers. The first and second containers pivot between a first, tilted position and a second, vertical position.

The food cooking apparatus may include a vent tube communicating with the passage. Further, it may comprise a filter for reducing odors, mounted on or in the vent tube.

The invention further provides that in the first position, a bottom of the basket is lower than the passage; there is provided a motor for rotating the basket in the first position, and for vertically vibrating the basket as the first and second containers move from the first position to the second position.

In accordance with other aspects of the invention, the first container may include a removable lid, and may include a filter in the lid. Further, the first container may include a shield which is sealed thereto.

In accordance with other aspects of the invention, the food cooking apparatus may include a drive shaft and a motor connected thereto, whereby the motor rotates the drive shaft and pivots the first container and the second container from the second position to the first position. Further in accordance with an aspect of the invention, there is provided a heater element disposed adjacent to the first container, and a heater element disposed adjacent to the second container.

In accordance with another aspect of the invention, the basket for the food cooking apparatus includes a flexible bottom wall, a side wall, a handle portion, a receiver formed in the handle portion, and an ultrasonic and rotary motion drive communicating with the receiver, wherein an ultrasonic vibrating motion is provided to the basket. Further, the basket may include several apertures permitting the passage of cooking liquid, such as oil, into and out of the basket.

In accordance with another aspect of the invention, there is provided a method of cooking food in a liquid. A basket is provided for containing the food. A cooking chamber is provided into which the basket is placed. Liquid may be placed into a heating chamber connected to the cooking chamber. The basket containing the food is placed into the first chamber. The heating chamber and the cooking chamber are pivoted about an intermediate pivot point, so that the liquid flows from the heating chamber into the cooking chamber. The basket is rotated, and the food is cooked in the basket in the cooking chamber. The basket is moved ultrasonically and vertically within the cooking chamber.

In accordance with a further aspect of the invention, there is provided a method of self cleaning a cooking device, further comprising the step of removing the cooking liquid from the cooking device, and placing water into the cooking chamber, and generally following the cooking steps with the cleaning liquid.

These and other objects, features and advantages of the present invention are readily apparent from the following drawings and detailed description. This is the brief description of the drawings.

BRIEF DESCRIPTION OF THE DRAWINGS

FIG. 16 is another breakout perspective view showing details of the lid and rotary drive;

FIG. 17 is a front view of the ultrasonic drive;

FIG. 18 is a front view of the ultrasonic drive in the retracted position;

FIG. 19 is a front view of the ultrasonic drive in the extended position.

DETAILED DESCRIPTION OF THE PRESENTLY PREFERRED EXEMPLARY EMBODIMENTS OF THE PRESENT INVENTION

Figure 1:
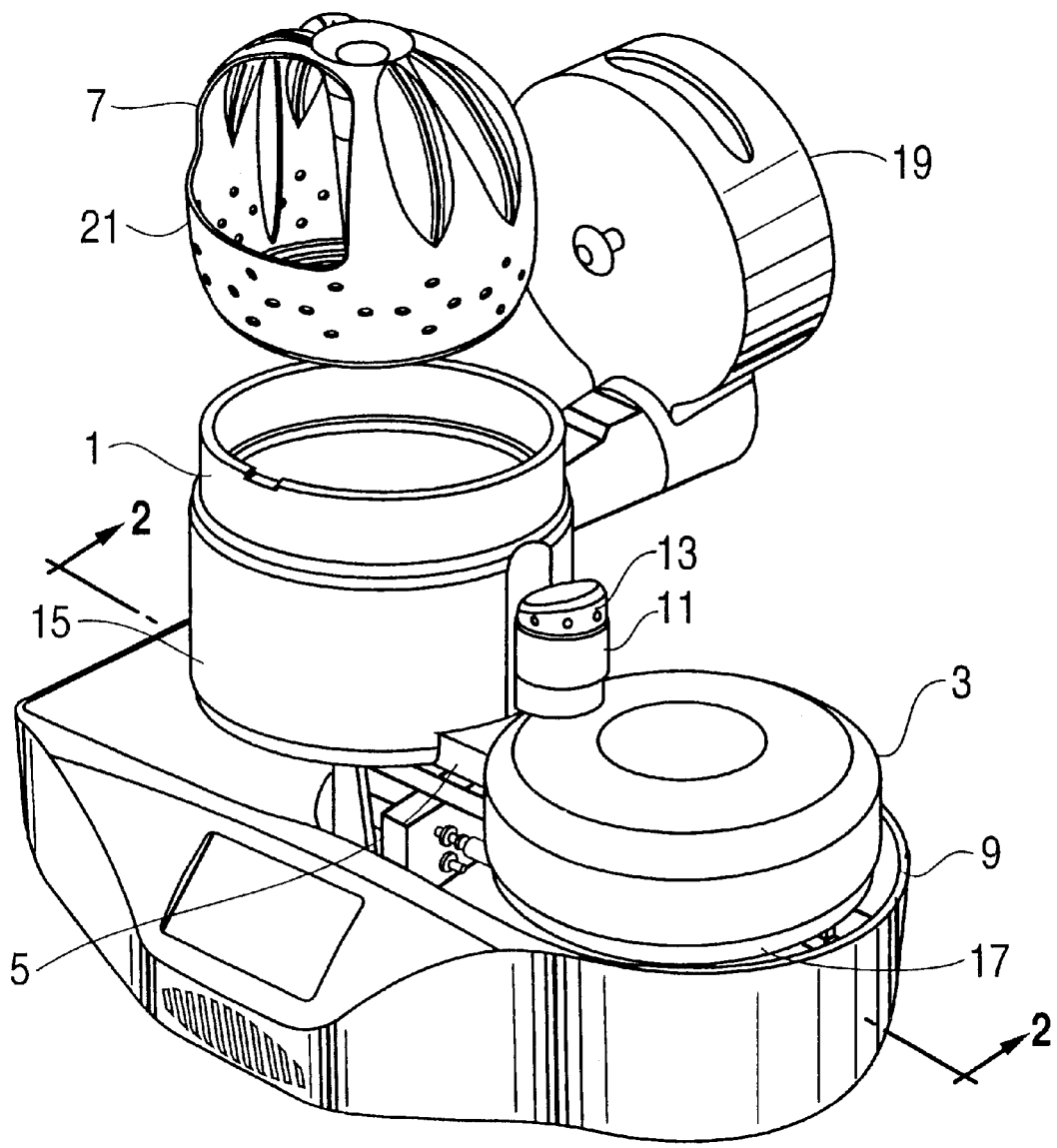
FIG. 1 is a perspective view of the food cooking apparatus with the lid opened.
Figure 2:
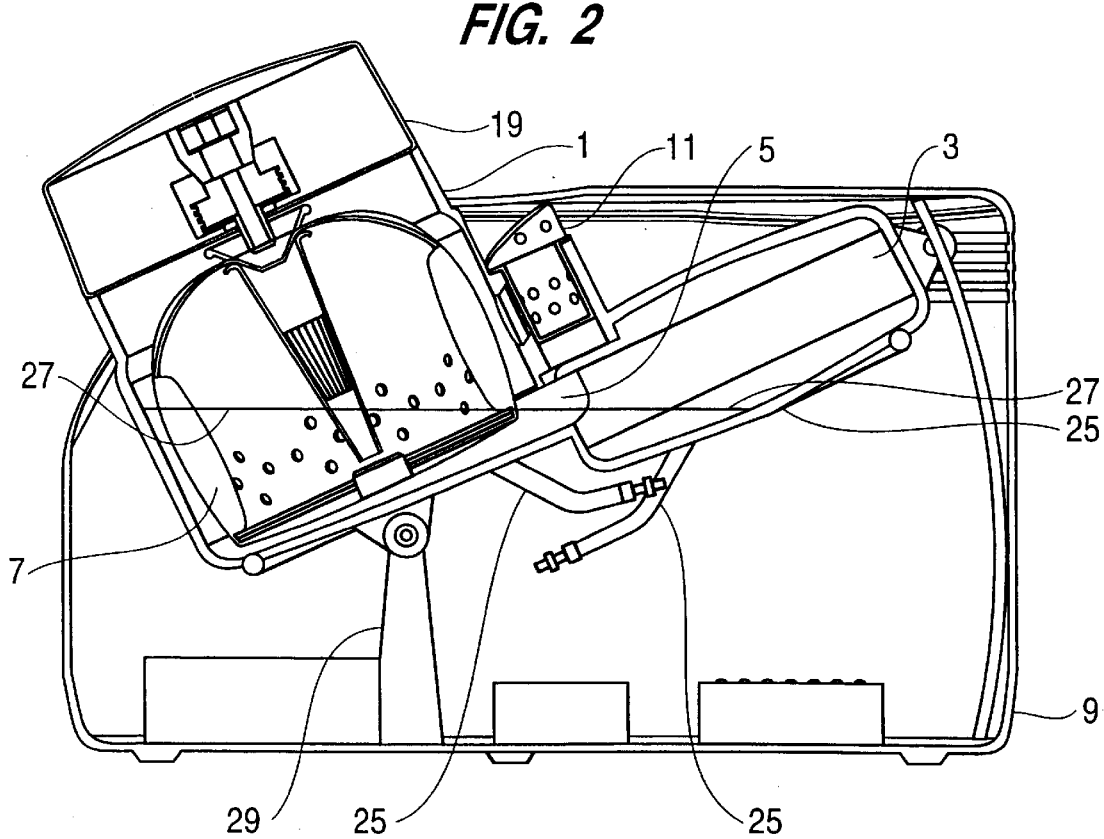
FIG. 2 is a cross-sectional view through the line II—II of FIG. 1 illustrating a food basket in its tilted position.

FIG. 1 illustrates the general layout of the food 30 cooking apparatus, positioned in the vertical position. The food cooking apparatus includes a first container 1, and a second container 3. Note in the vertical position that the bottom 15 of the first container 1 is elevated with respect to the bottom 17 of the second container. The first container 1 and second container 3 are connected therebetween by a passage 5. In the present embodiment, the passage 5 connects an upper area of the second container 3 to a lower area of the first container 1. The passage is shown as a semi-rectangular chamber. It could, however, be formed as a tube or a directly adjacent opening between the two containers. The passage 5 permits the cooking liquid such as oil which is placed into the second container 3 to flow into the first container 1 when the first and second containers are in the tilted position, as illustrated in FIG. 2.

FIG. 1 also illustrates the basket (here, the second embodiment of the basket). Food to be cooked is placed into the basket 7, which is placed into the first container. It should be noted that the first container is circular, and that the basket is of a sufficiently small diameter to fit snugly into the first container. The basket has a generally circular shape which will rotate evenly about a central axis. The basket includes one or more apertures 21, through which food can be placed into the basket. Further details of the basket will be discussed below.

Figure 3:
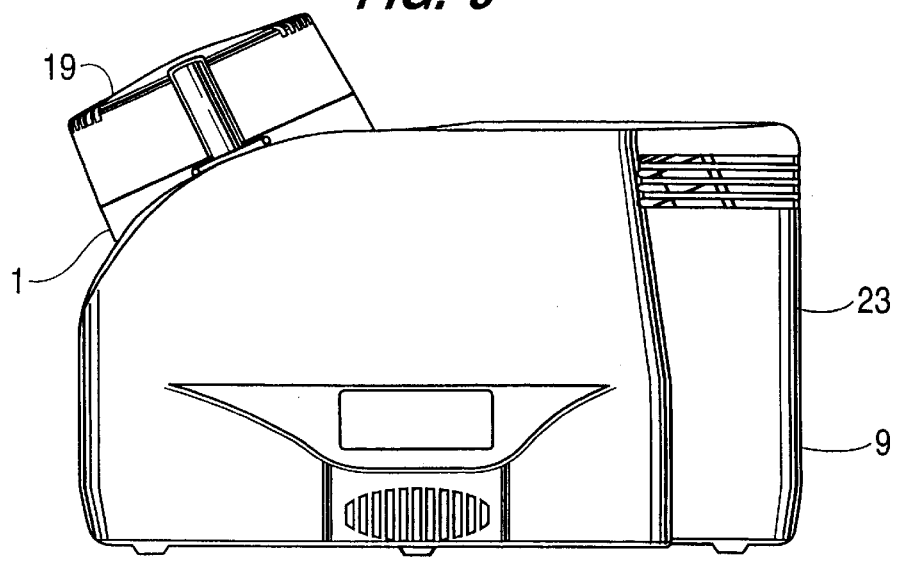
FIG. 3 is a front view of the food cooking apparatus with the first container and second container in a tilted position.

The food cooking apparatus advantageously includes a housing 9 into which the various components are placed. The housing, along with the shield 23 illustrated in FIG. 3 provides an enclosure for the components, and assists in channeling cooking odors through other vents or openings which may be provided. The shield further prevents splatters which may caused by the cooking oil.

A vent 11 is provided for the food cooking apparatus. The purpose of the vent is to direct food cooking odors. It is advantageously provided on the second container.

Moreover, a filter 13 for reducing food odors can be provided on or inserted into the vent 11.

The food cooking apparatus also comprises a lid 19. The lid closely fits onto the first container. It provides protection from spills and flying cooking liquid. The lid 19 can also be used to house the drive mechanism for the food basket. As illustrated here the lid 19 is pivotally connected to the housing 9. However, the lid could be separable.

Oil vapors which may occur from the heated oil in the first or second container are filtered and vented through the vent 11 and vent filter 13. An optional filter cap can be provided over the vent 11.

In order to transfer cooking liquid, such as oil, which is located in the second container 3, the first container and second container preferably rotate or pivot about an intermediate point, preferably up to about 25°. This rotational motion permits oil or other cooking liquid which is in the second container 3 to be transferred into the first container 1. The first or second container can comprise a level indicator, to indicate the amount of oil or other cooking liquid which is included. The filter 13 provided in the vent 11 is preferably a two-stage charcoal filter. Also, an exterior oil drain valve can be included underneath the second container 3, for easy removal of oil or other cooking liquid contained therein.

In the preferred embodiment of the cooking apparatus intended for home use, the second container has a capacity for 1 liter of oil or other cooking liquid.

The tilting action between the first and second positions can advantageously be provided by a tilt motor 29, such as a DC motor with a rack and pinion drive.

The cooking liquid will be placed into the food cooking apparatus second container 3. The preferred method for loading the cooking liquid is as follows.

The cooking liquid, such as oil, is placed into the first container 1, in the untilted position. The cooking liquid, such as oil, will run into the second container 3 through the passage 5 by gravity. Food can then be placed into the basket 7, which is loaded into the first container 1, and the lid 19 is closed over the first container. Having been loaded with cooking liquid and food, the food cooking apparatus is prepared to begin cooking.

FIG. 2 illustrates the first and second containers in the tilted position. Here, the first and second containers 1, 3 have been tilted from the vertical position of FIG. 1 into the tilted position of FIG. 2. The cooking liquid 27 has been caused to run by gravity into the first container 1. Note that heating elements 25 are provided, preferably below the second container 3 for heating the oil while it is in the vertical position, and also below the first container 1, for continuing to heat the oil while the device is in the tilted position. Advantageously, the first and second containers do not rotate or pivot from the vertical position to the tilted position until the cooking liquid 27 within the second container 3 has achieved a sufficiently high cooking temperature. Therefore, the device advantageously includes a temperature gauge, which engages the tilt motor. Thus, for example, when the cooking oil reaches a sufficiently high temperature such as 400° F., the first and second containers are tilted into the tilted position as illustrated in FIG. 2. The heating elements which are provided are preferably 750 watt tube heaters.

FIG. 3 illustrates the food cooking apparatus in the tilted position. Note that the lid 19 is preferably able to be opened so that the user may gain access to the first container 1, as desired. As shown in FIG. 3, the housing 9 together with the shield 23 provides a sealed and enclosed environment for the containers and related components. The second container 3 has a size which sufficiently fits inside the housing 9 and shield 23 to still remain enclosed while tilted.

Figure 4:
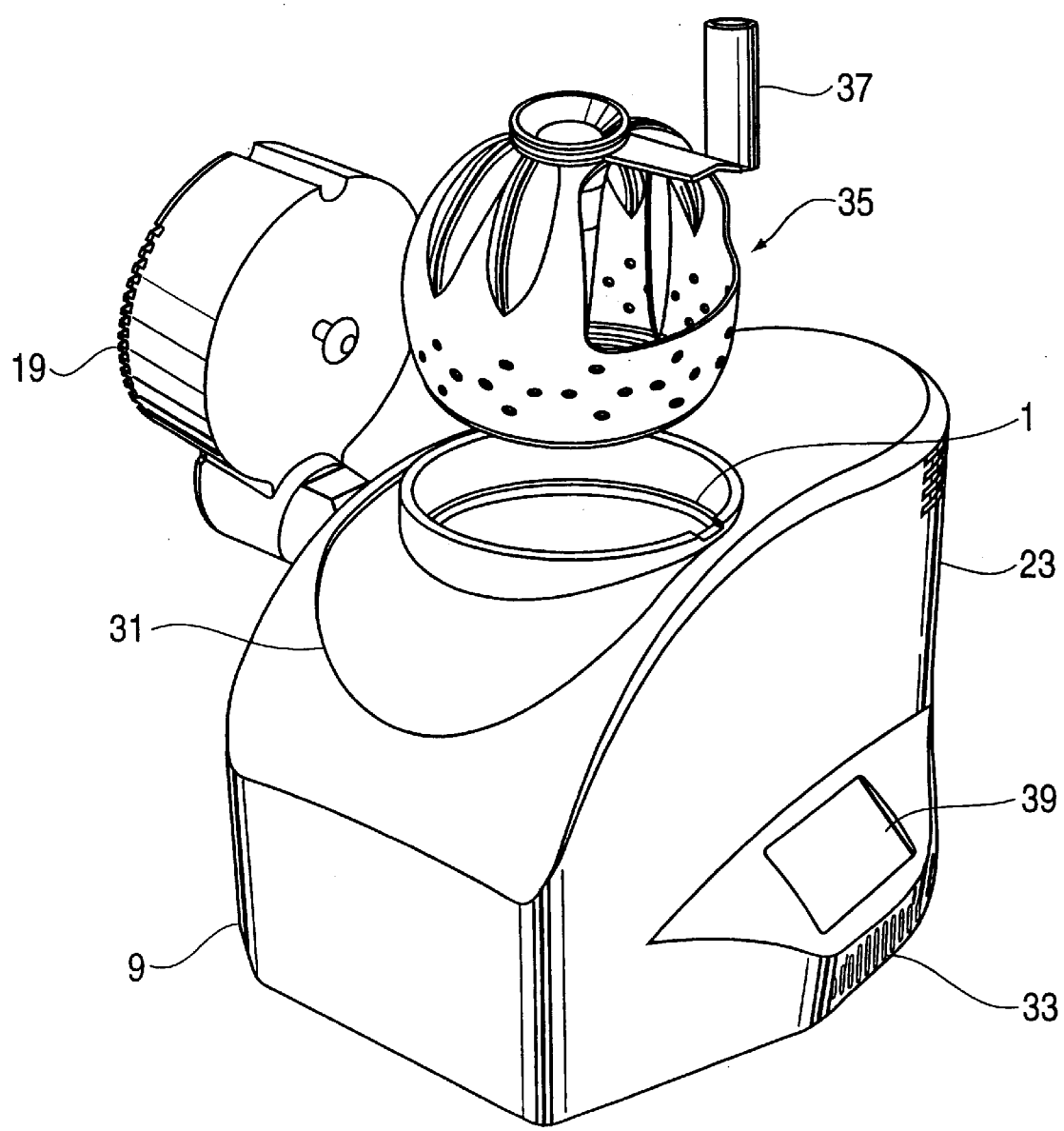
FIG. 4 is a perspective view of the food cooking apparatus shown in FIG. 1, with shield, and cooking basket removed.

FIG. 4 illustrates a food cooking apparatus for the second embodiment of the food cooking basket 35, preferably with handle 37. In this illustration, the first and second containers are in the vertical position. A sliding shield 31 is provided around the frying chamber, to keep the unit sealed. Advantageously, an O-ring seal around the protruding first chamber will provide a leak tight joint preventing any spills or food from entering into the housing. The shield can be configured to run inside a track that is also sealed, and guides any spills down and away from the inside of the housing.

Advantageously, the housing 9 can also be provided with cooling fins 33.

Reference is again made to the basket 35 with handle 37. The handle 37 permits the basket to be removed when hot. However, as further detailed below, this configuration of the basket allows the basket to spin and move vertically. The housing 9 can optionally provide a control panel 39, for example, to permit access to on/off switches, etc.

Figure 5:
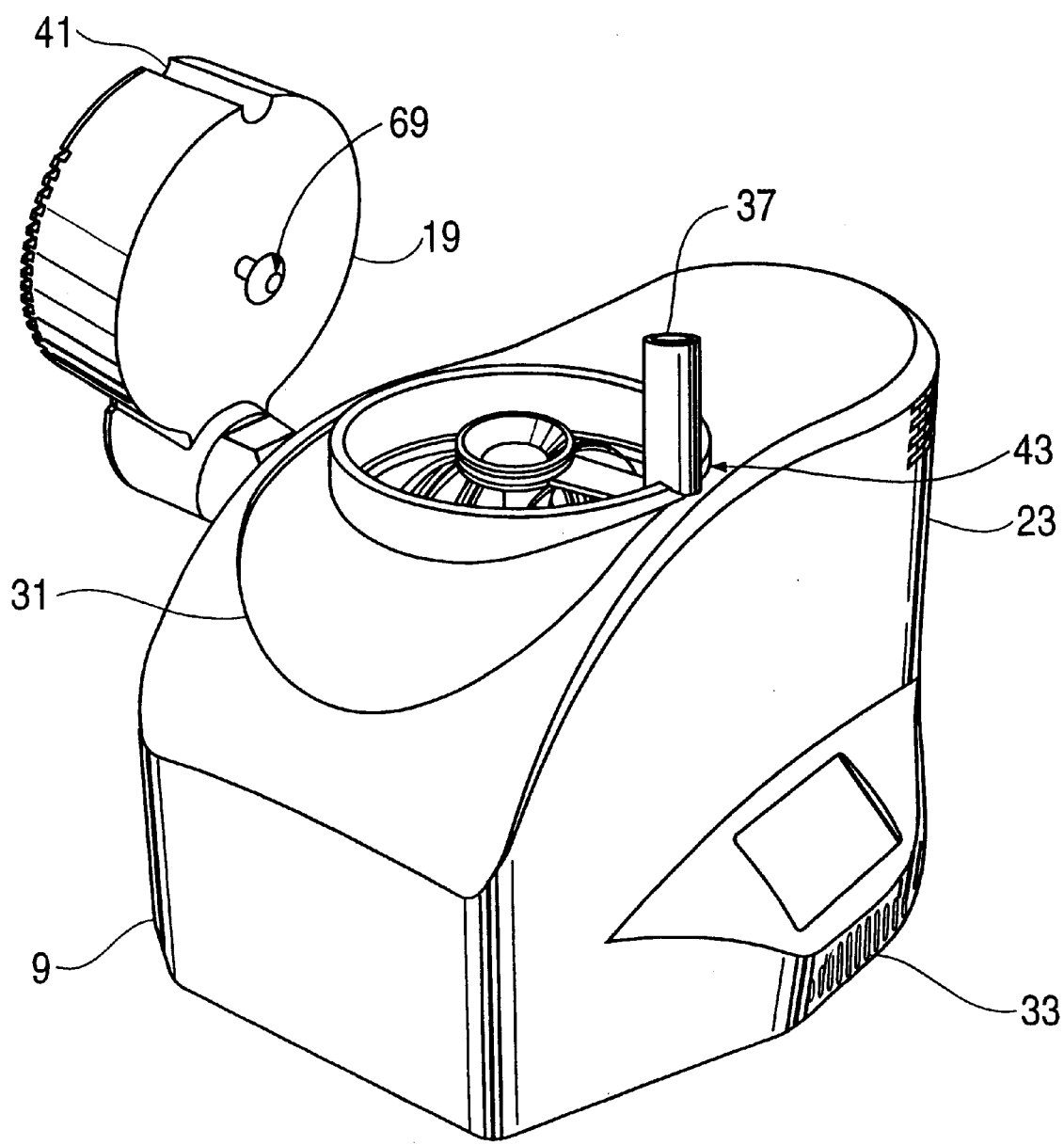
FIG. 5 is a perspective view of the device in FIG. 4, with cooking basket inserted into a first container.

Reference is now made to FIG. 5. The lid includes a lid notch area 41.

Figure 6:
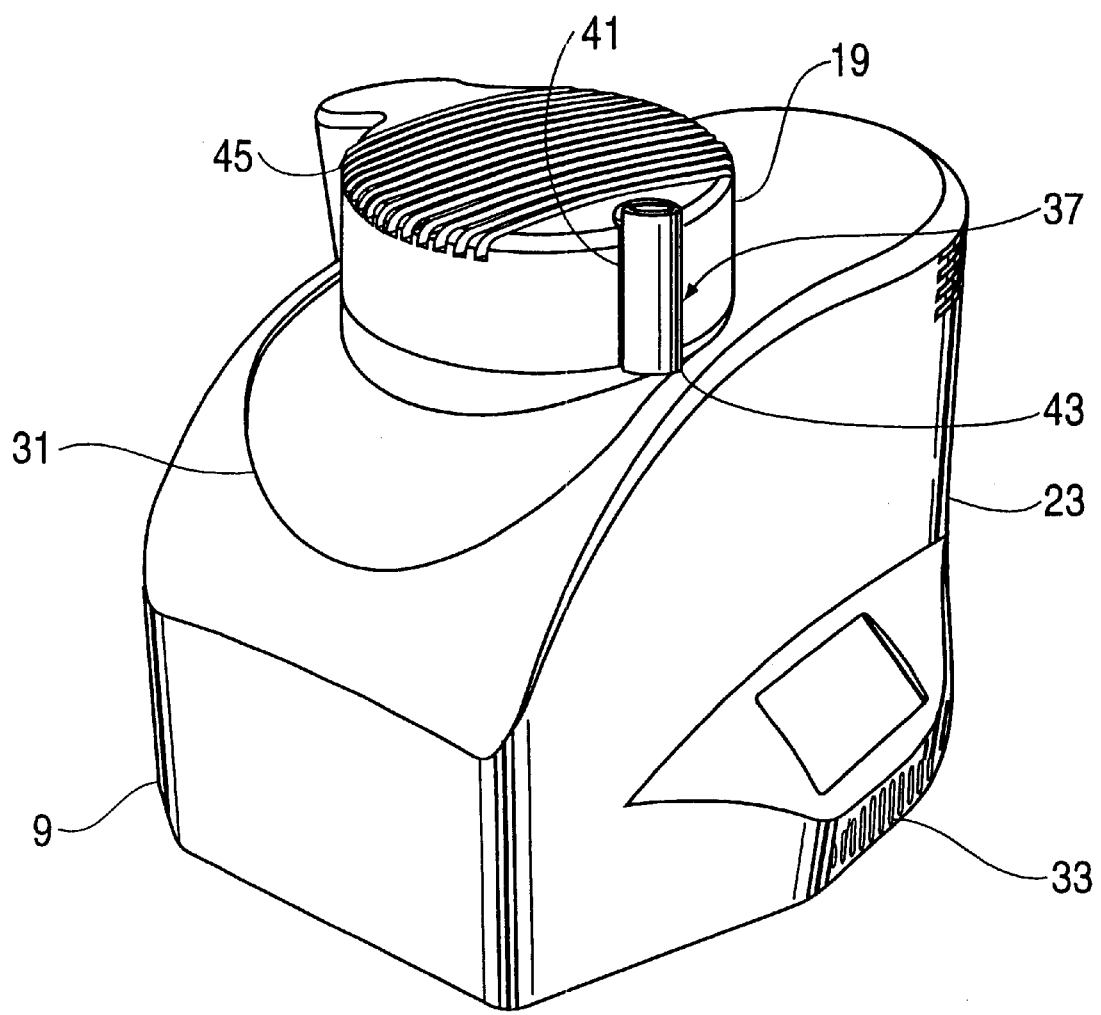
FIG. 6 is a perspective view of the device shown in FIG. 4, with lid closed.
Figure 7:
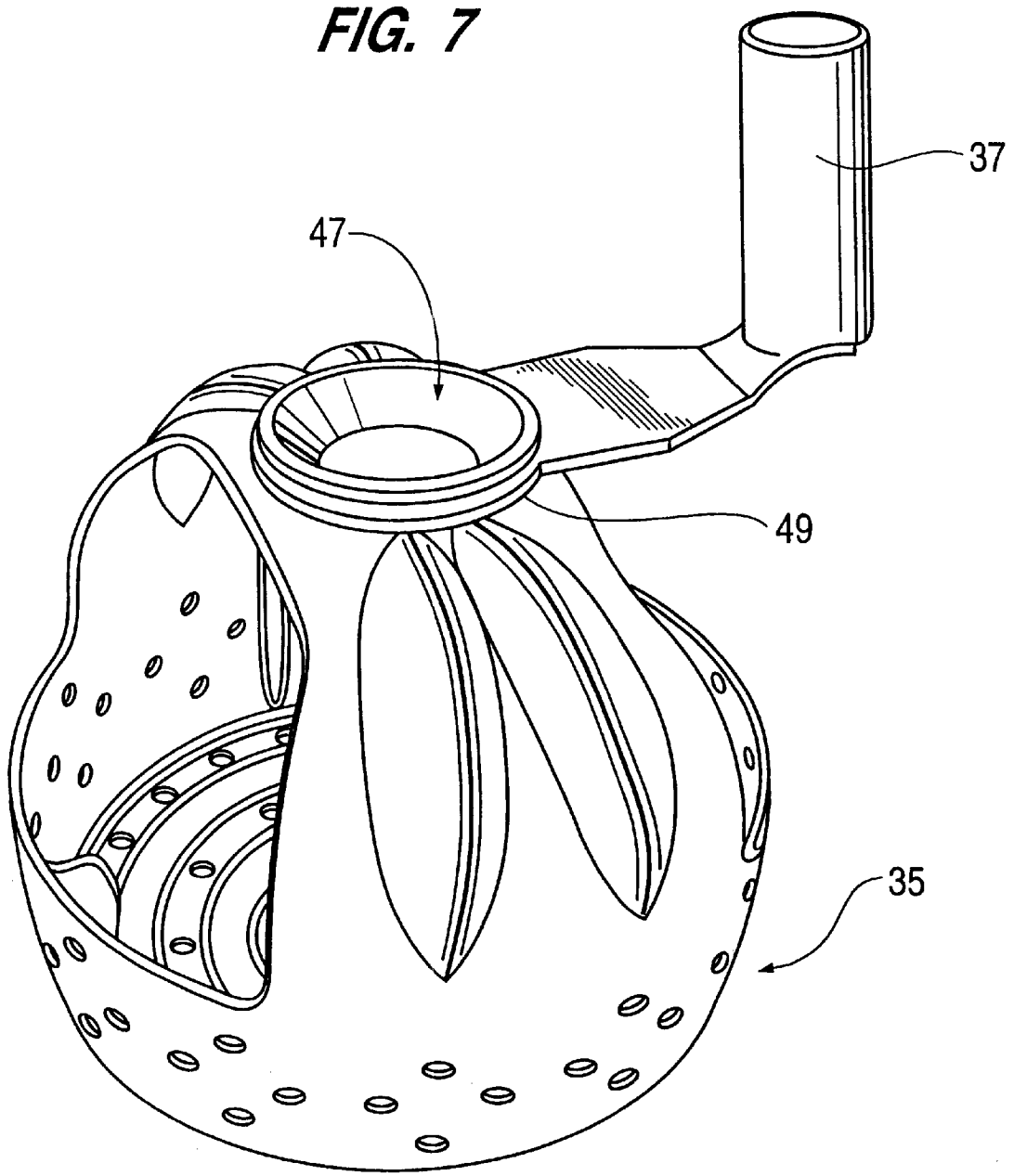
FIG. 7 is a perspective view of a second embodiment of the food basket.
Figure 8:
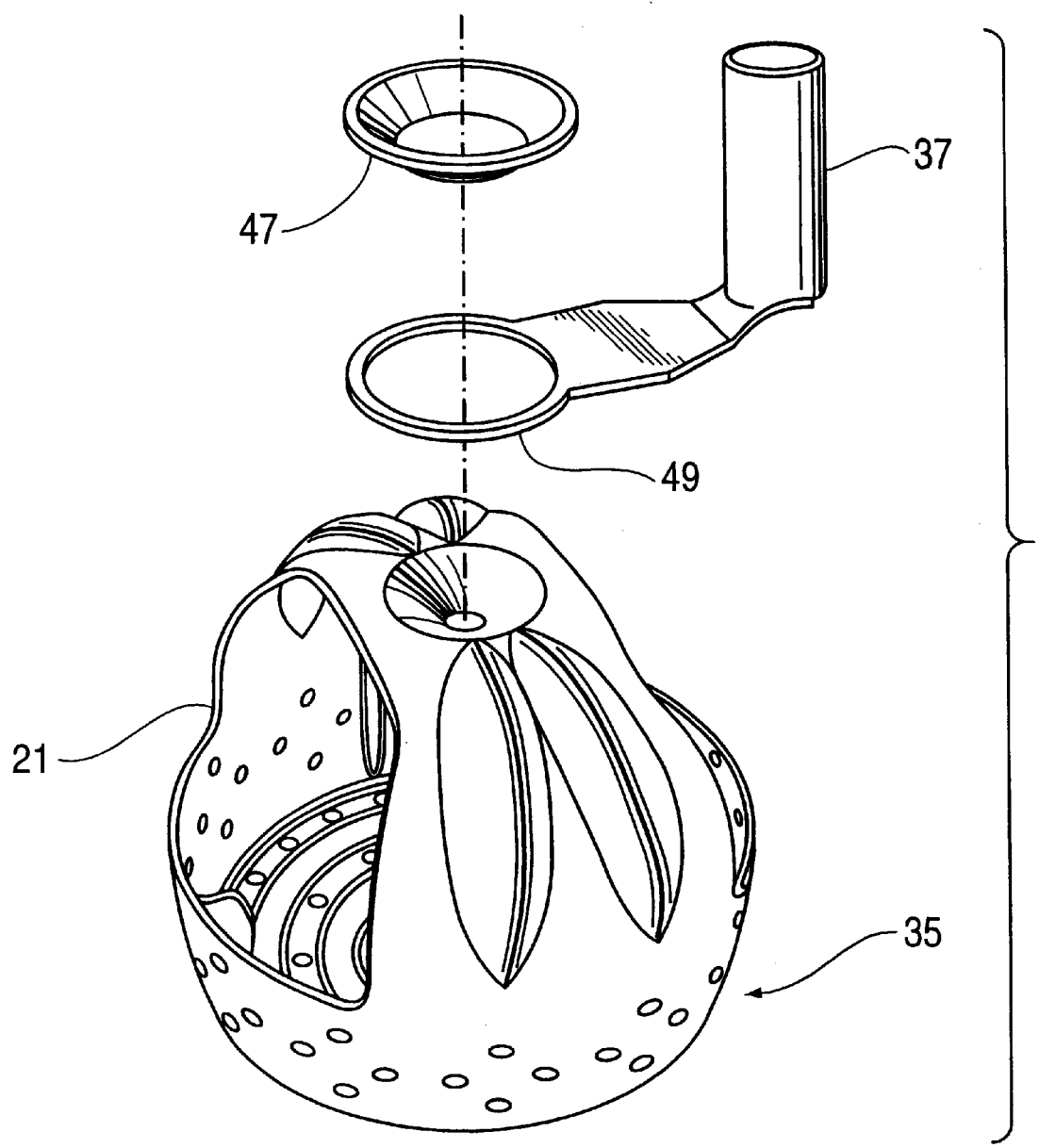
FIG. 8 is a perspective breakout view of the first embodiment of the food basket.

As is illustrated in FIG. 6, when the lid 19 is closed, the handle 37 protrudes through the lid notch area 41 and container notch area 43.

FIG. 6 also illustrates the lid vent provided within the lid 19. The charcoal filters may be optionally placed inside the lid 19 to provide filtering.

The spinning of the basket is made possible due to the slip ring 47 attachment of the handle 37 to the top of the basket 35. 0.020 inches clearance is allowed in the ring for spinning; vertical motion is also permitted due to another 0.020 inches clearance between the handle plate 49 and the slip ring 47. Ultrasonic motion of the basket will use approximately 0.005 inches of motion. When the basket 35 is mounted in the first container 1, the basket is held at the top and bottom with bearings; the handle 37 fits into the notch areas 41, 43 of the lid and container. In this manner, the handle does not touch the basket 35 when mounted, thereby allowing the basket to move freely apart from the handle.

Figure 9:
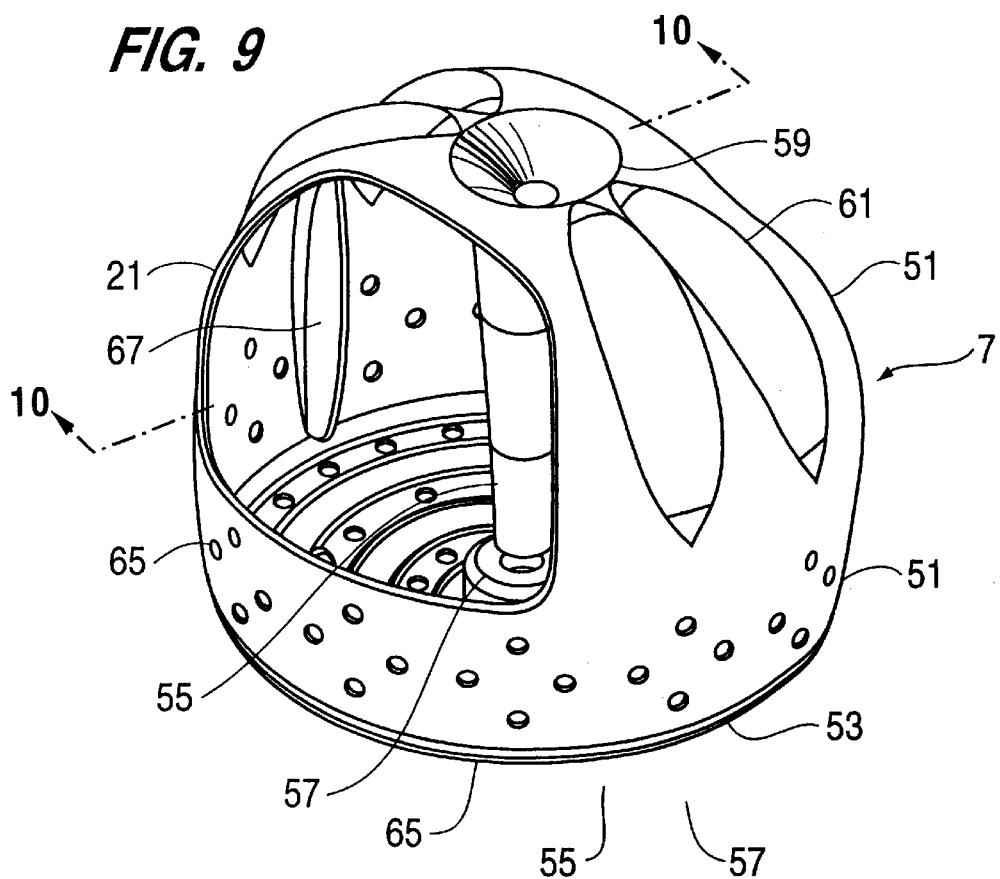
FIG. 9 is a perspective view of a second embodiment of the food basket.

Reference is now made to FIG. 9, showing an embodiment of the basket 7 without handle. The principles described and illustrated herein apply also to the basket with handle 35. The basket has been tuned approximately to 25 kH of ultrasonic motion. The sidewalls 51 are stiffer relative to the basket base 53, to permit vertical motion of the basket base 53 and thus more even energy dissipation into the food within the basket.

Reference is made to FIGS. 5 and 9. The lid 19 is provided with the rotary drive 69. When the lid is closed, the rotary drive 69 engages the receiver 59 formed in the basket 7. The rotary drive causes the basket to rotate around the basket's central axis. The basket includes a center column 55. The center column preferably has a cone shape. The center column vibrates radially at the base center 57 to direct energy into the center of the basket 7. Meanwhile, the relatively stiff sidewalls drive the entire basket vertically.

Figure 10:
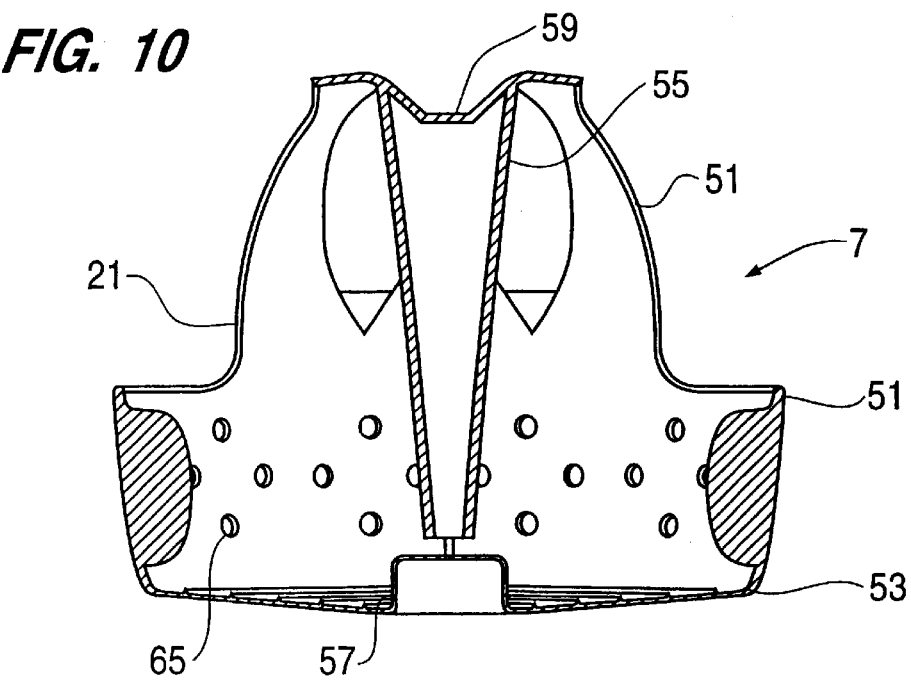
FIG. 10 a cross-sectional view through the line X—X of FIG. 9.

FIG. 10 further illustrates the base center 57 and the receiver 59. It should be noted that the basket includes petaloid shaped stiffening ribs 61. The petaloid shape of the stiffening ribs provides additional downward stiffness, and relatively less stiffness horizontally. Further, the basket includes openings 65 formed therein into which and out of which the cooking liquid can flow. Although in the present embodiment the openings 65 are illustrated as perforations, many other possible structures for permitting the free flow of oil to and from food will be appreciated by one of skill in the art. The basket also includes projections or paddles for positioning the food; and ribs providing further stiffness. This can be provided in combination, as in the preferred embodiment, by vertical ribs 67 which project a small distance into the basket.

Figure 11:
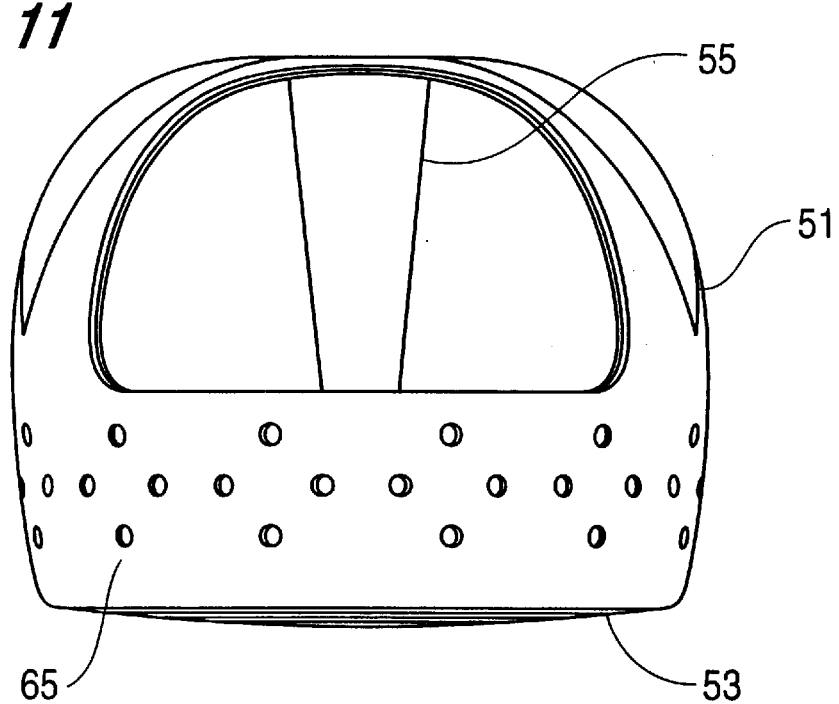
FIG. 11 is a front view of the second embodiment of the food basket.
Figure 12:
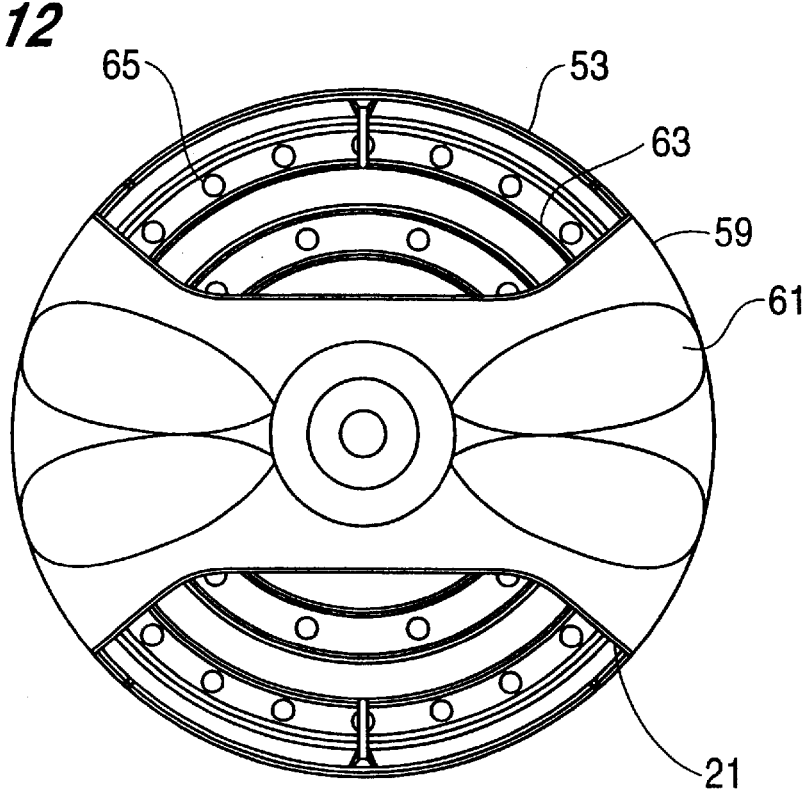
FIG. 12 is a top view of the second embodiment of the food basket.

FIG. 11 provides another view of the basket, and illustrates the general configuration thereof. Reference is made to FIG. 12. Base ribs 63 are provided radially on the basket base 53. These radial ribs are believed to promote a bellows effect during flexure. The basket base 53 also includes openings 65 formed therein to permit the flow of cooking liquid into and out of the basket.

When the first and second containers are in the tilted position, with the lid 19 closed, the cooking basket will be driven by the rotary drive 69, thereby rotating the cooking basket through the heated cooking liquid bath, for a specified time. Thereby, the food can be cooked for a specified period of time, such as four to fifteen minutes. A timer can be provided in order to automatically return the first and second containers from the tilted position to the vertical position. As the chamber tilts from the tilted position back to the vertical position, the basket will increase its speed to 60 RPM and will begin the vertical ultrasonic motion as the basket reaches 60 RPM. As the oil or other cooking liquid continues to drain, the spinning and vertical motion will continue for the remainder of a predetermined period, preferably, ten to fifty seconds. Once the first and second containers are returned to the vertical position and the ultrasonic cycle is completed, advantageously the food cooking apparatus will turn itself off. A user can then open the lid and withdraw the basket from the unit, and then remove the food.

After draining the cooking liquid from the second container, the unit can be self cleaned. Specifically, water or other cleaning liquid can be loaded into the first container just as the cooking liquid is normally loaded in. The water or cleaning fluid optionally may be heated in the second container, and the unit can be tilted from the vertical position to the tilted position, with a rotational and ultrasonic motion of the basket providing cleaning to those parts. Once the cleaning is completed, the first and second containers should be returned from the tilted position to the vertical position, and the water or other cleaning fluid should be drained from the food cooking apparatus. The cleaning cycle can be shorter or longer than the cooking cycle, as preferred. Additionally, the food cooking apparatus can be provided with variable length cooking times and variable temperature settings.

Figure 13:
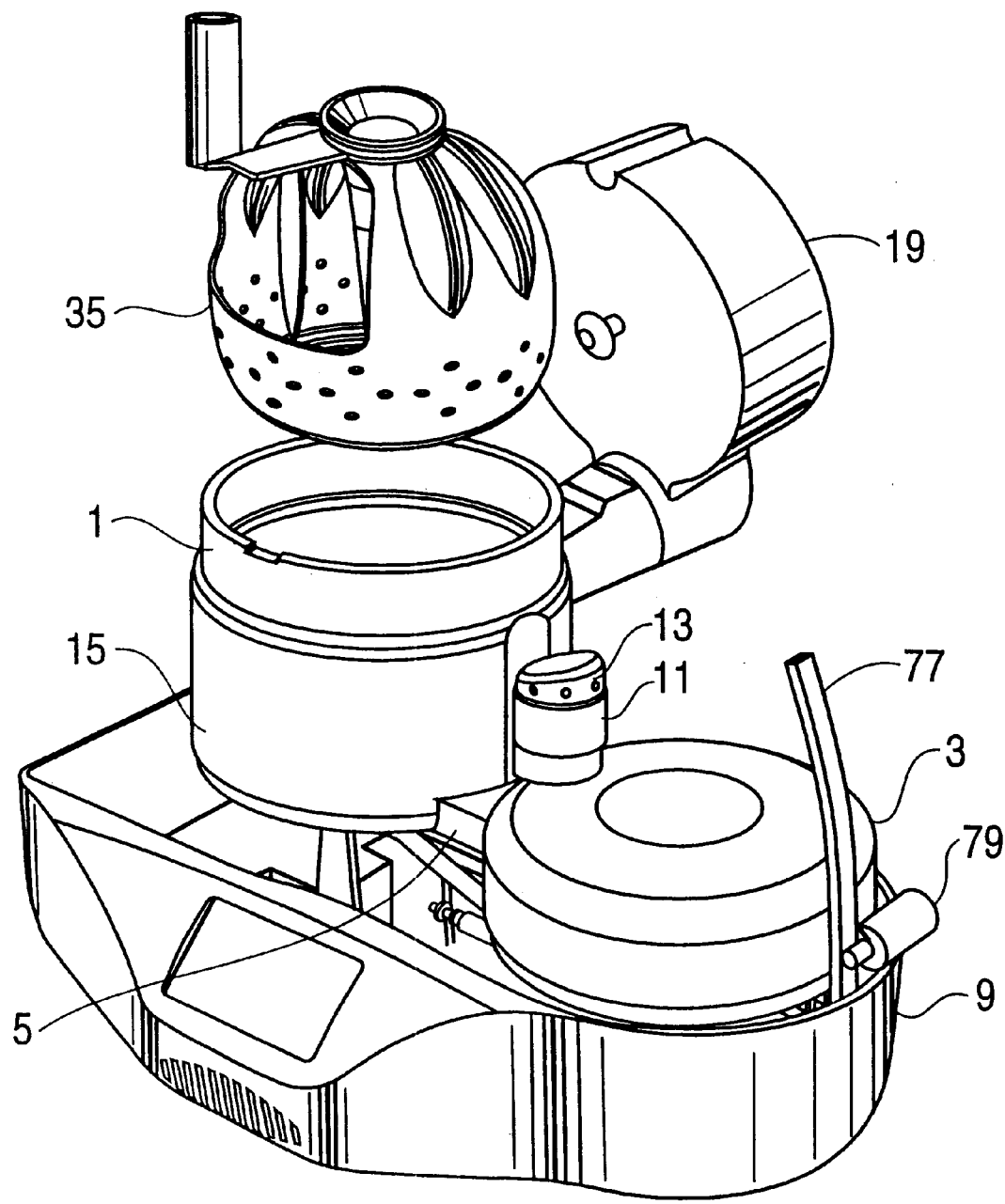
FIG. 13 is a perspective view of a third embodiment of the food cooking apparatus with the lid opened.

FIG. 13 illustrates a third embodiment of the food cooking apparatus, here in the vertical position. To assist with secure tracking while tilting between the vertical and tilted positions, a track is provided along which one or both of the containers 1, 3 runs. Preferably, the track is a molded gear pack 77 attached to the housing 9; the second container 3 advantageously interfaces closely with the track via a pinion 79 mounted on the second container 3. The pinion 79 preferably includes a DC gear motor.

Figure 14:
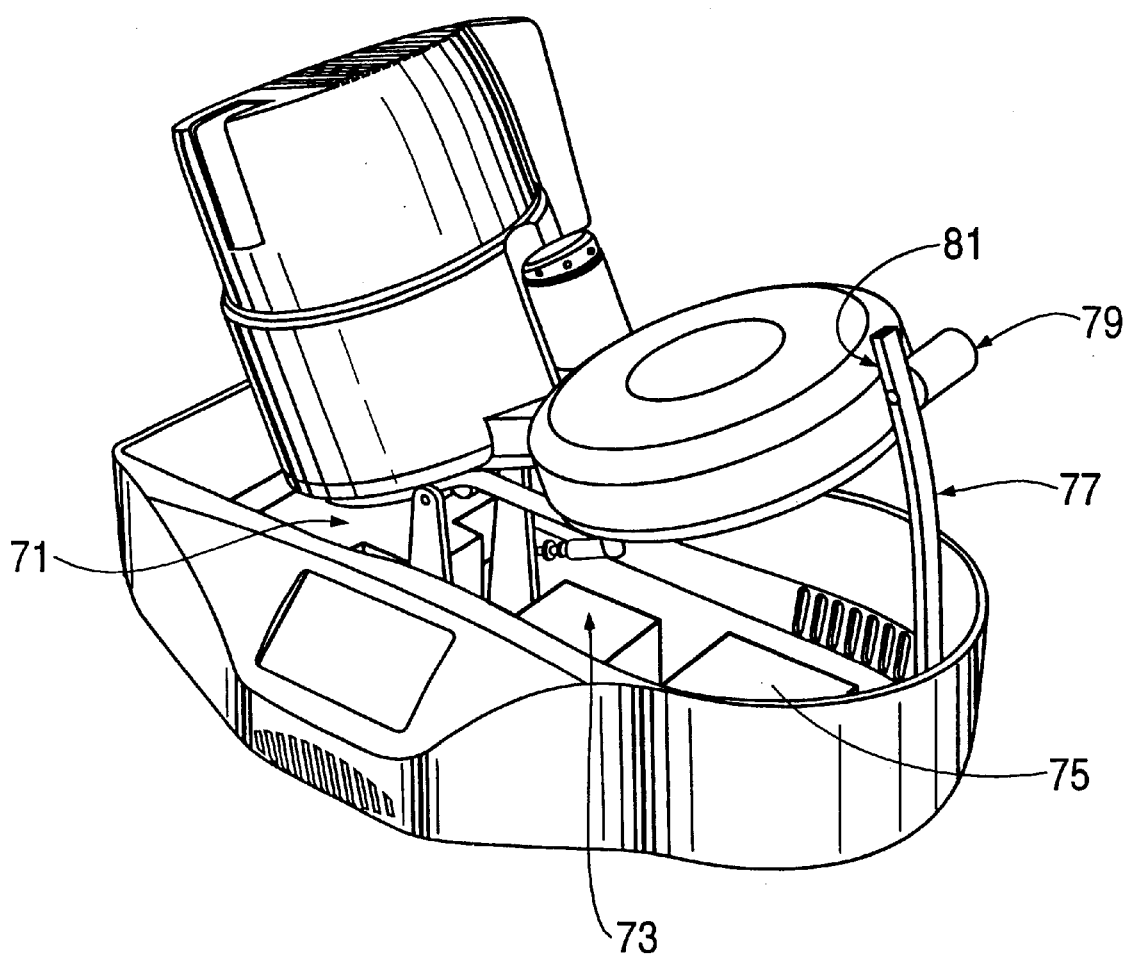
FIG. 14 is a perspective view of the third embodiment, in the tilted position.

FIG. 14 further illustrates the third embodiment of the food cooking apparatus, here in the tilted position. A control circuit 71 is advantageously used to automatically note cooking liquid time and temperature, to initiate the rotational movement of the first and second containers 1, 3 between the tilted and vertical positions, and to initiate the rotary drive 69 and ultrasonic mechanism for the desired period of time. Sufficient room may be provided at any location in the housing to accommodate the control circuit 71. An ultrasonic driver board 73 is also provided in the housing. The driver board 73 advantageously operates 30 w @ 30 khz; and is connected to the ultrasonic mechanism in the lid 19 to drive the ultrasonic movement of the ultrasonic mechanism, further described below. The power supply 75 is advantageously +12+18+5 v, and is used to power the various drive mechanisms. The power supply 75 is also advantageously located within the housing.

Figure 15:
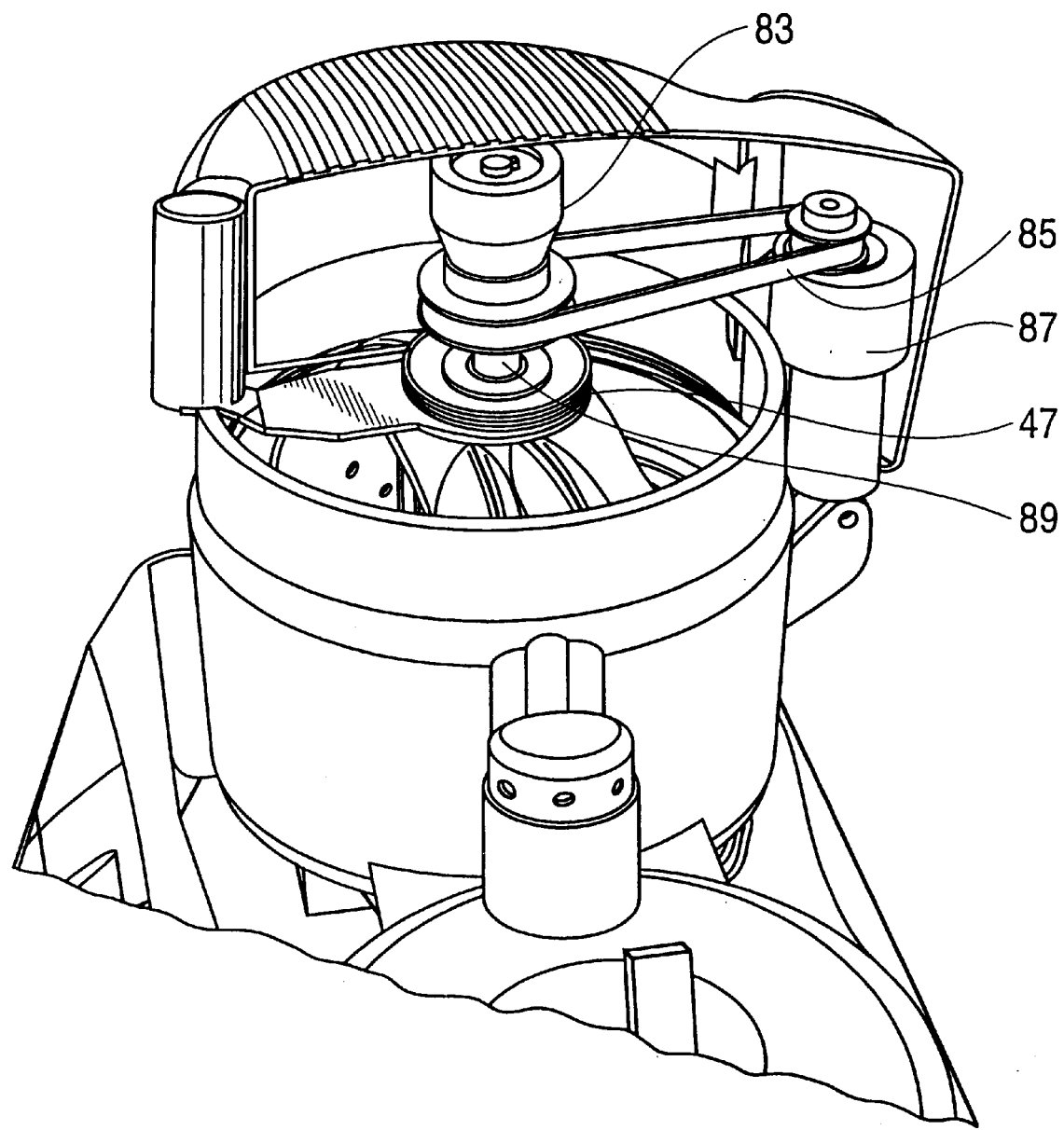
FIG. 15 is a breakout perspective view showing details of the lid and rotary drive.

FIG. 15 illustrates details of the rotary drive. The rotary drive 69 interfaces with the basket to provide ultrasonic cleaning of the food in the basket. The ultrasonic cleaning of the food in the basket provides further extraction of the fat, cooking oil, or other cooking fluid from the food in the basket. Specifically, the basket is provided not only with rotational motion but also with ultrasonic motion, thereby imparting at least two motions to the food.

Ultrasonic motion is provided in order to extract excess cooking fluid from the food. Typically cooking fluid is on or near to the surface of the food. Therefore, if the food is ultrasonically vibrated, the surface cooking fluid will be released momentarily, in effect by being thrown off of the food in the several directions of the ultrasonic motion. The ultrasonic vibration provides multiple directions of motion, thereby releasing cooking fluid on food surfaces in multiple directions.

In this embodiment, ultrasonic motion is imparted to the bottom of the food basket which is less rigid than the walls of the basket, thereby vibrating in a manner similar to the vibration of a speaker. That is, the food basket has vibrational motions which are short and rapidly repeated. It will be appreciated that the ultrasonic motion could be imparted to the food in other ways, for example, by walls in the basket, or in another setting, by a membrane which is not necessarily part of a basket. These ultrasonic motions, although efficient at releasing cooking fluid from multiple food surfaces, are advantageously supplemented by a second motion which rapidly moves the food away from the momentarily released cooking fluid. Rotational motion of the food is preferably employed to move the food away from the released cooking fluid. In this embodiment, the food basket is rotated in order to impart a second motion to the food. The rotational motion of the food throws the momentarily released cooking fluid further away from the food, as well as rapidly moving the food away from the momentarily released cooking fluid. It will be appreciated that other second motions could be used to rapidly move the food away from the released cooking fluid, for example, rapid conveyor belt motion in a single direction, or shaking up and down.

In this embodiment, the ultrasonic and rotational motions are imparted to the basket and hence to the food in the basket via the rotary drive 59 and ultrasonic drive driving a drive shaft and received within the receiver 59 of the basket. In order to permit the handle 37 on the basket to remain stationary, the slip ring 47 is provided and is mounted in the receiver 59 (hidden from view) in the basket. The rotational motion is provided to the drive shaft by any conventional mechanism, for example, a synchronous drive belt 85 driven by a mechanism, preferably a 12–24 DC servo gear mechanism 87. Advantageously, a bearing 89 such as a linear rotary bearing is provided in the receiver where the drive shaft contacts the receiver. The ultrasonic mechanism preferably also drives the drive shaft to impart the ultrasonic motion to the basket bottom. Illustrated in FIG. 15 is the preferred transducer coil and bearing 83 of the ultrasonic mechanism.

FIG. 16 further illustrates the rotary drive and the lid when opened. The drive shaft 100 with rotary drive 69 fits into the receiver 59 with slip ring 47 inserted therein. The rotary drive 69 advantageously has a shape which fits closely into the receiver 59; here, the rotary drive has a truncated cone shape. FIG. 16 shows that many of the ultrasonic and rotary drive elements are advantageously disposed within the lid, thereby shielding these elements from cooking fluids.

FIG. 17 is a front view of the ultrasonic and rotational drive of the preferred embodiment. It will be appreciated that there are several ways to impart ultrasonic motion to a membrane on which cooked food is located. The preferred embodiment provides a basket, in which the membrane is formed by providing a bottom of the basket which is less rigid than the walls of the basket, the walls being driven by the ultrasonic drive and thereby imparting the ultrasonic motion to the food. The drive drives the frying basket with a rotary motion, clockwise and/or counter clockwise, at various RPMs depending on the type and weight of food, and size of basket. The RPM's may be up to 120 RPM, but preferably about 60 RPM. In addition, the drive provides vertical motion at ultrasonic frequencies.

The drive interface 99 is mounted, advantageously, on the lid, and contacts to the basket receiver 59. The ultrasonic and rotational drive includes an upper bearing 91, ultrasonic coil 93, belt drive 95, pulley 97, drive interface to basket 99, linear/rotary bearing 101, magnetic plates 103 and upper drive shaft 105. The magnetic plates 101 are connected to the upper drive shaft and drive interface to basket, for example by brazing. The upper drive shaft 105 is restrained by an upper bearing 91, preferably double-row bearing and E-clips as illustrated. The drive interface is supported laterally, preferably by a linear/rotary bearing 101, and is permitted to move vertically. The magnetic plates 103 impart upward and downward motion to the drive interface 99 under control of the ultrasonic coil 93.

Reference is made to FIG. 18. As illustrated, the upper bearing 91 allows the upper drive shaft 105 and drive interface 99 to spin about their axis in direction A or in the opposite direction. The linear/rotary bearing 101 permits rotational motion of the drive interface 99 about its axis in direction A (and back in direction C shown in FIG. 19), as well as vertical motion of the drive interface 99 downward in direction B and back. When ultrasonic power is provided to the ultrasonic coil 93, the magnetic plates 103 foreshorten the drive, as shown in FIG. 18.

FIG. 19 illustrates the magnetic plates 103 at rest, when ultrasonic power is not provided to the ultrasonic coil 93. In this position, the drive interface 99 received within the receiver will press down on the basket. As described above, the basket walls are more rigid than the bottom of the basket, and the bottom of the basket is more flexible than the walls of the basket.

The receiver, having been driven downwards or upwards, itself drives the walls of the basket downwards or upwards respectively. The walls of the basket, having been driven downwards or upwards, impart vertical motion to the bottom of the basket. The basket is preferably tuned to about 30 khz of ultrasonic motion, although other frequencies, such as down to about 25 khz, are possible. The food located in the basket is ultrasonically moved vertically at the rapid ultrasonic rate, thereby momentarily dislodging cooking liquid on the surface of the food. Additionally, the food located in the basket is ultrasonically moved vertically at the rapid ultrasonic rate, thereby momentarily dislodging cooking liquid on the surface of the food. Additionally, the food located in the basket is rotated, thereby moving the food away from the dislodged cooking liquid and further throwing off additional cooking liquid.

Figure 20:
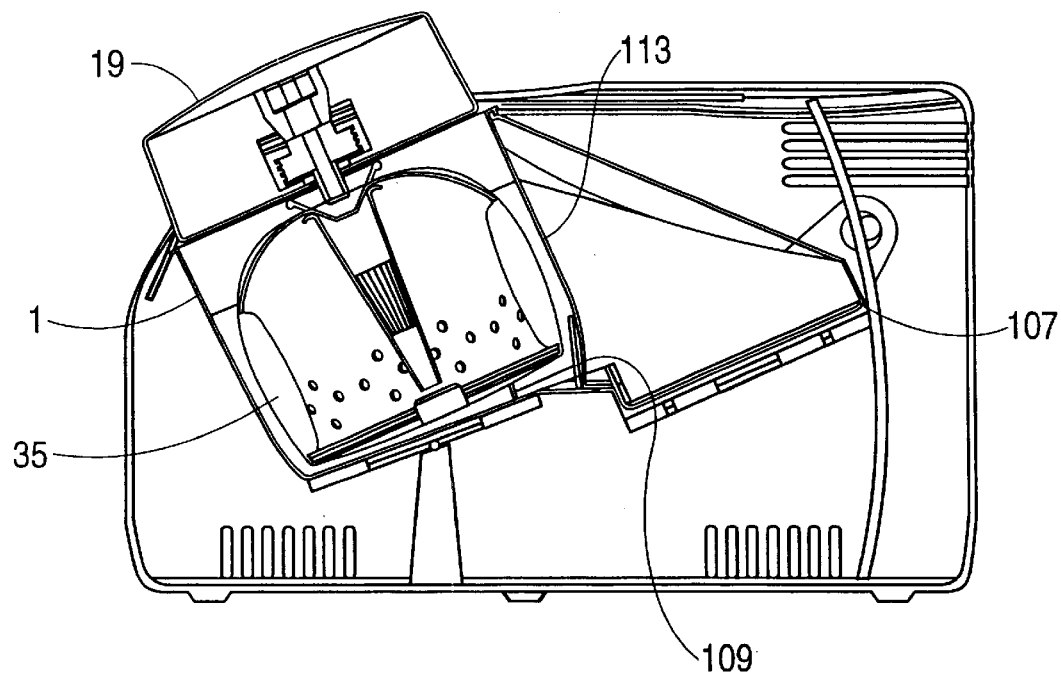
FIG. 20 is another breakout perspective view showing details of the lid and rotary drive.

FIG. 20 illustrates an alternate second container 107. In this embodiment, the first and second containers 1, 107 share an adjoining wall 113. The second container 107 has an approximately polygonal shape with a sloped upper portion, to maximize the volume of the second container. Here, the passage 109 between the first and second containers is simply an opening in the adjoining wall 113, at a lower portion of the first container 1.

Figure 21:
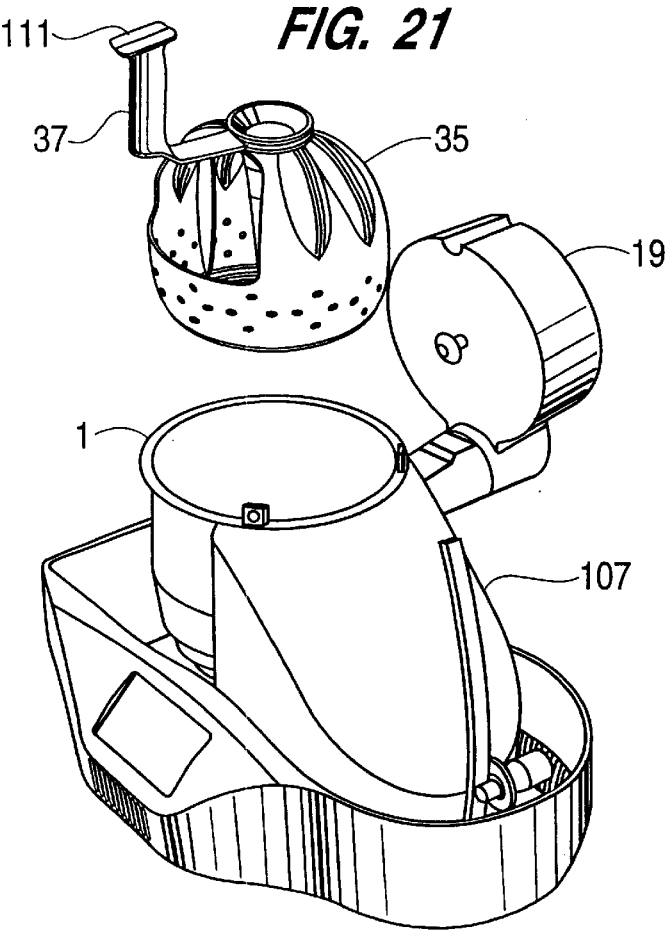
FIG. 21 is a cross-secional view of the food cooking apparatus with alternate second container.

FIG. 21 further illustrates the shape of the preferred second container 107.

Figure 22:
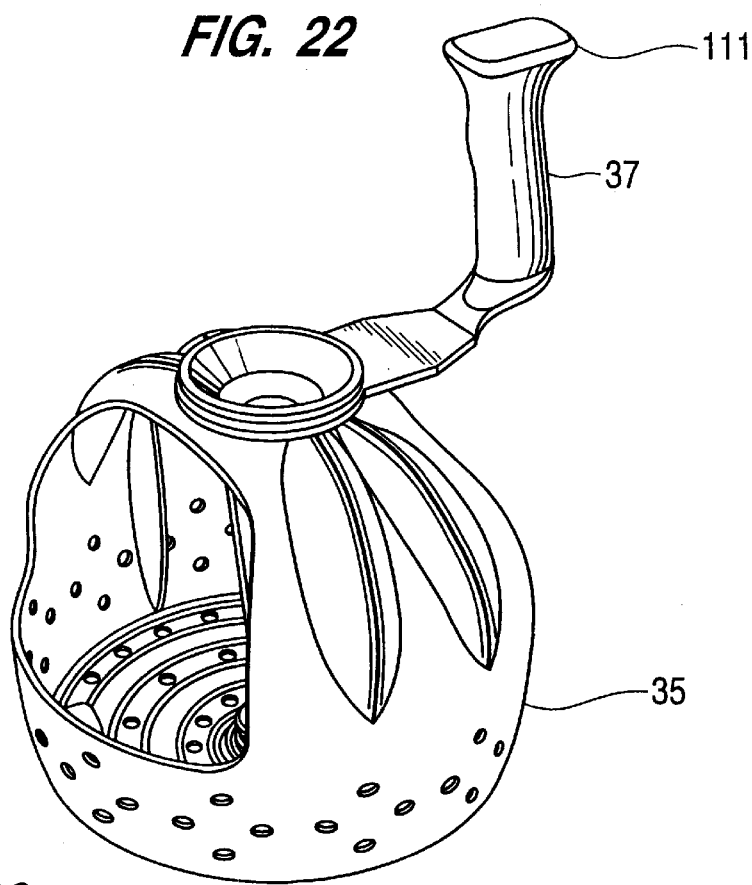
FIG. 22 is a perspective view of the food cooking apparatus of FIG. 20.

FIG. 22 illustrates the cooking basket 35 with handle 37 and a grip 111 provided on the handle. Here, the grip 111 is a flared portion unitary with the handle 37, to alleviate slipping. Other grips are possible.

Figure 23:
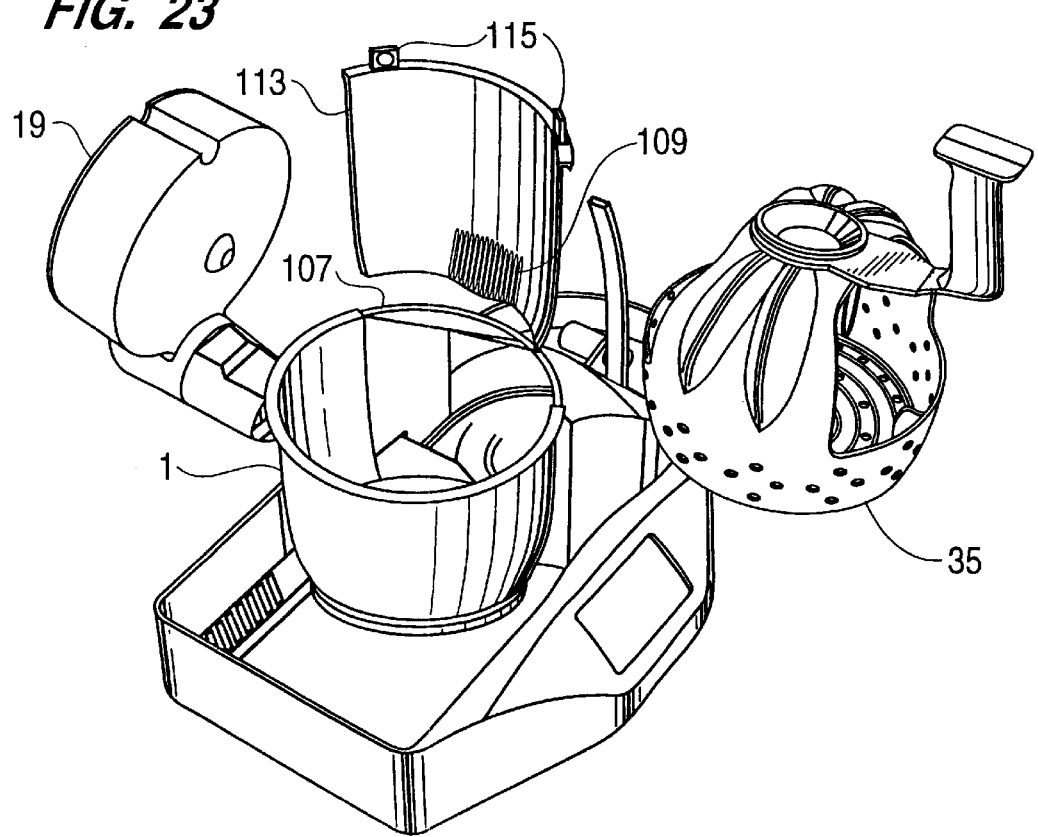
FIG. 23 is a perspective view of the food cooking apparatus of FIG. 20, showing the wall of the second container.

FIG. 23 shows that the wall 113 between the first and second containers 1, 107 is advantageously removable, to permit cleaning. Additional filers 115 may be provided on the wall 113.

Figure 24:
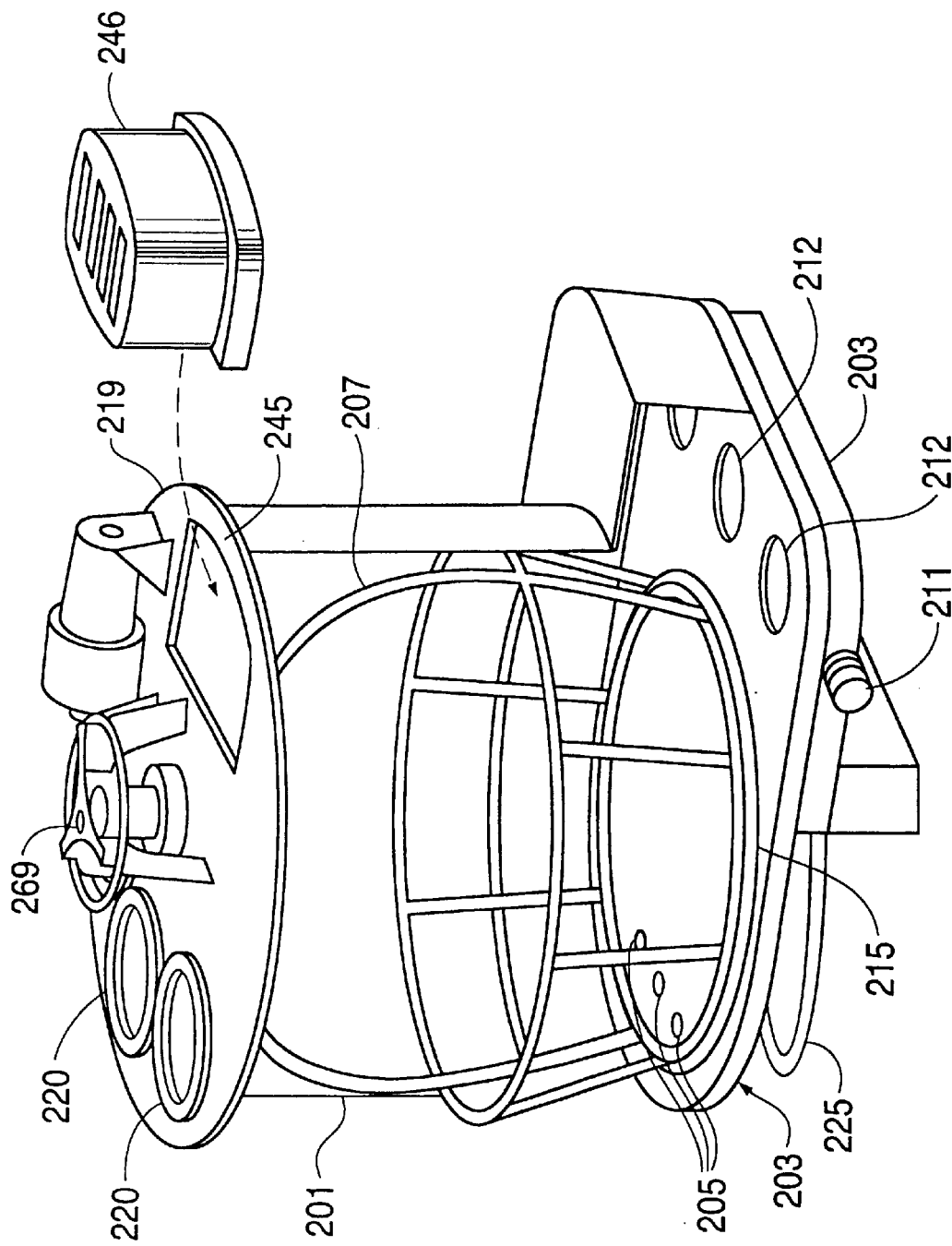
FIG. 24 is a perspective cut-away view of a fourth, preferred embodiment of the food cooking apparatus.

FIG. 24 illustrates a fourth embodiment of the food cooking apparatus. This is the presently preferred embodiment for domestic settings due to its more compact configuration and elegant structure. The apparatus includes a first container 201 and a second container 203. Again, a base of the second container 203 is generally lower than a base of the first container 201. A passage 205, of which there may be several, is formed between the first and second containers 201, 203. The passage 205 permit cooking liquid to flow between the first and second containers 201, 203. It is believed that smaller and/or offset passages 205 are desirable to limit the splattering of cooking liquid onto the food during heating. Advantageously, a bottom 215 of the first container 201 may be removed for access to the second container 203.

In the preferred version, the second container 203 includes a stepped bottom, that is, there is more than one level in the bottom. The stepped form accomodates, for example, a heating element 225. In this version, the second container can hold, for example, two litres of cooking liquid. A drain opening 211 may be incorporated, advantageously in the second container 203.

One or more vents 212 may be formed in the upper portion of the second container 203. These vents vent heat and cooking odors away from the second container 203. Here, they are vented into the first container 201.

A lid 219 is provided for the first container 201, advantageously with a filter 246 inserted into an opening 245 defined in the lid 219. One or more transparent or translucent windows 220, for example, of PYREX™ material may be provided in the lid 219. The lid may be connected to the first container 201 via hinges 218.

A rotary drive 269 contacts the basket 207. The basket 207 is shown for illustration purposes only with the sides or wires removed.

Figure 25:
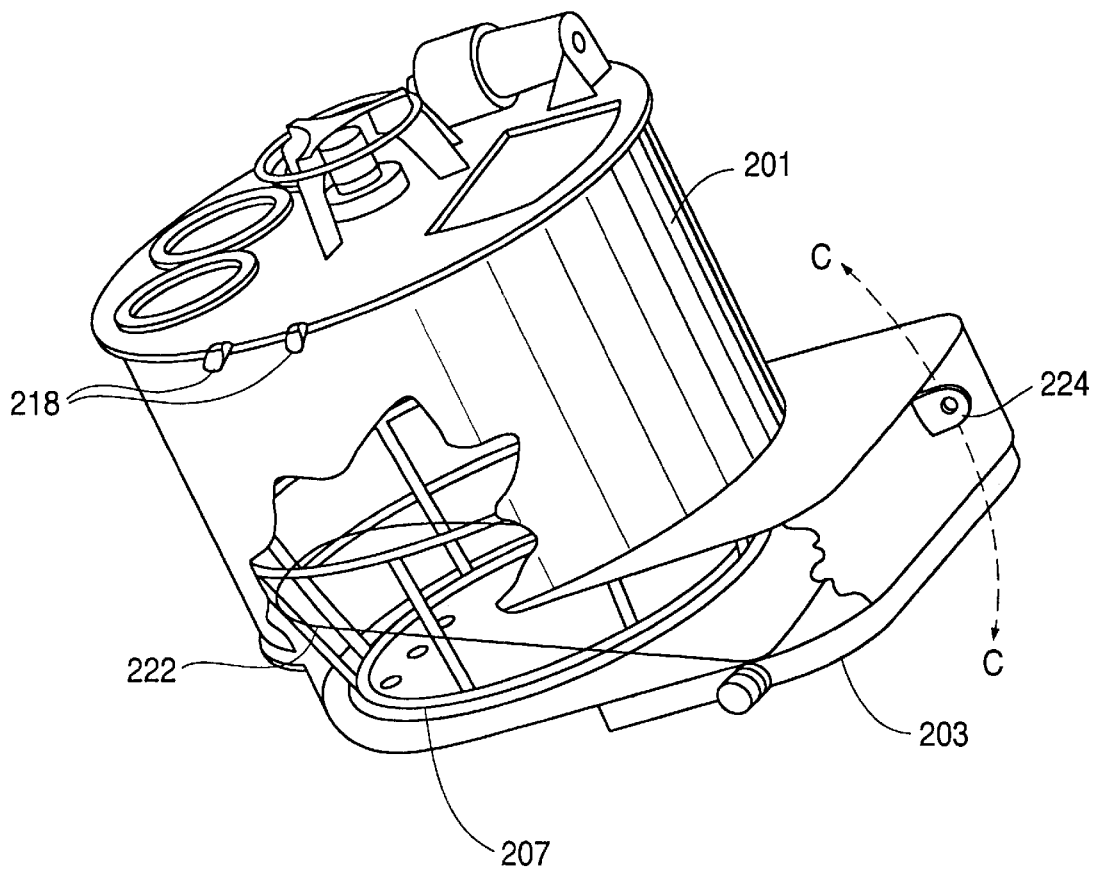
FIG. 25 is another perspective cut-away view of the fourth embodiment.

FIG. 25 illustrates the currently preferred embodiment when tilted. The cooking liquid 222 is in the first container 201, and the basket 207 may be rotated through the cooking liquid. A tilt motor (not illustrated) may drive a contact 224, to tilt the device.

Figure 26:
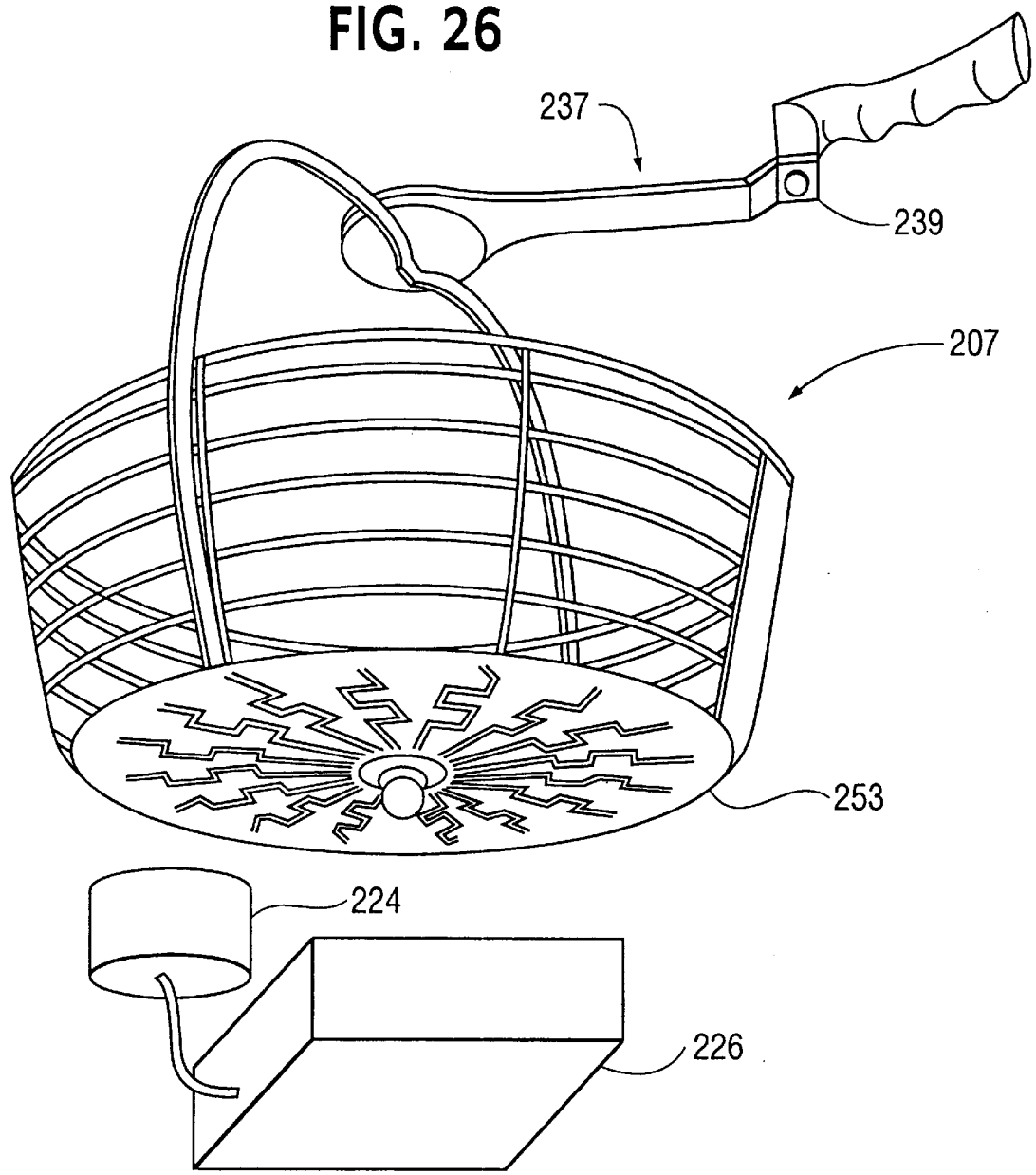
FIG. 26 is a view of an ultrasonically tuned cooking basket.

Reference is made to FIG. 26, illustrating an ultrasonically driven basket 207. A handle 237 is provided on the basket 207. Advantageously, the handle 237 may be collapsed, for example, by swinging around any intermediate point 239 so that the handle does not protrude.

The basket bottom 253 is ultrasonically responsive. Preferably, it comprises a magnetic substrate such as stainless steel with a cutout pattern tuned to the appropriate level, for example, 25 khz. A magnetic coil 224 pulsed at said level (for example 25 khz) causes the basket bottom 253 to resonate ultrasonically at the corresponding harmonic frequency, causing cavitation to take place on the surface of the basket bottom 253. Power is provided by an ultrasonic power unit 226, for example at 50 watts.

A method for cooking food in the food cooking 5 apparatus is provided as follows, with reference to FIG. 4. A cooking liquid, such as oil, is loaded into the first container 1, while the first container and second are in the vertical position. By gravity, the cooking liquid in the first container 1 flows into the second container (3 shown in FIG. 1). The cooking oil is then heated by heating elements 25 to a predetermined cooking temperature. The first and second containers 1, 3 are then tilted from the vertical to a tilted position, approximately 25° rotation, as shown in FIG. 2. The lid 19, having been closed, includes a rotary drive which engages the receiver 59 in the basket 7. When the first and second containers are in the tilted position, the food within the basket is in the cooking liquid. The basket rotates, thereby insuring adequate coverage of the food in the cooking liquid, for a predetermined period of time. Once the time expires, the first and second containers begin to rotate back to the vertical position, and the rotational motion of the spinning basket is increased, preferably up to approximately 820 RPM so that the spinning motion causes the cooking oil to fly off of the food. Meanwhile, the coil is pulsing the base of the basket from underneath. The base of the basket flexes, similar to a stereo speaker membrane, due to the stiff sidewalls driving the entire basket vertically. This ultrasonic vertical motion causes the cooking liquid to be thrown off of the food. When the timer expires on the ultrasonic motion, the basket is prepared to be removed from the food cooking apparatus and the vertical position.

The food cooking apparatus can be cleaned as follows. Water or other cleaning fluid is loaded into the first container, just as if preparing to cook food. The water is fed by gravity into the second container, where it is heated. After the water has achieved a sufficient temperature, the first and second containers are automatically tilted or rotated approximately 25° to a tilted position, wherein the water, now heated, passes into the first container. The basket is rotated through the cleaning liquid for a predetermined period of time. The first and second containers are returned from the tilted position to the vertical position, while the basket commences with the ultrasonic cleaning cycle. Once the first and second containers are in the vertical position, the cleaning cycle is completed and the cleaning fluid or water flows back into the second container. The cleaning fluid or water can be drained by a drain valve from the second container.

A method for ultrasonic treatment of food to reduce excess fat and oil or other cooking liquids is provided as follows. Food cooked in fat, oil, or other cooking liquid is positioned on a flexible membrane. The membrane is preferably tuned ultrasonically to 30 khz. The membrane is flexed ultrasonically at a high speed, whereby the food thereon is rapidly vibrated, momentarily releasing cooking fluids located on and near the surface of the food. Typically, this flexure is vertical. While the membrane is flexed ultrasonically, the food is rapidly moved away from its current position. Such motion could be rotational or horizontal, for example, and is preferably in a direction different from the direction of the ultrasonic motion. Following the foregoing disclosures, it will be appreciated that this method can be used for small or large amounts of food, or for food of small to large sizes. Further, this method can be performed within an enclosure if desired in order to limit the amount of flying fluid particles, or in an open setting. It will be appreciated that a rotatable basket with flexible membrane bottom can advantageously be used to provide the described motions.

The illustrated embodiments can be readily used in a domestic setting; however, the embodiments can be adapted to and/or used in commercial settings.

While the preferred mode and best mode for carrying out the invention have been described, those familiar with the art to which this invention relates will appreciate that various alternative designs and embodiments for practicing the invention are possible, and will fall within the scope of the following claims.

What is claimed is:

1. A food cooking apparatus, comprising:
   a first container;
   a second container connected to said first container, having a passage defined therebetween and communicating with said first container;
   a basket rotatably and slidably mounted in the first container; and
   wherein said first container and said second container pivot between a first position and a second position, and wherein said basket is provided with a rotational motion and an ultrasonic motion.

2. The food cooking apparatus as claimed in claim 1, wherein, in said first position, a bottom of said basket is lower than said passage, further comprising a motor for rotating said basket in said first position, and for axially displacing said basket as the first and second containers move from said first position to said second position.

3. The food cooking apparatus as claimed in claim 1, said first container further comprising a removable lid.

4. The food cooking apparatus as claimed in claim 3, further comprising a filter in said lid.

5. The food cooking apparatus as claimed in claim 1, further comprising a drive shaft and a motor connected thereto, whereby said motor rotates said drive shaft to pivot said first container and second container between said first and second positions.

6. The food cooking apparatus as claimed in claim 1, further comprising a heater element disposed adjacent to said second container.

7. The food cooking apparatus as claimed in claim 1, wherein said basket includes an ultrasonically tuned bottom wall, further comprising an ultrasonic drive driving said bottom wall.

8. The food cooking apparatus as claimed in claim 1, wherein said basket includes a plurality of apertures formed therein permitting the passage of cooking liquid.

9. The food cooking apparatus as claimed in claim 3, further comprising a window in said lid.

10. A container for ultrasonically removing cooking liquid from food, comprising:

(a) a basket having an ultrasonically tuned bottom wall on which food is to be positioned;

(b) an ultrasonic drive driving the bottom wall of the basket; and (c) a rotational drive connected to the basket.

11. The container, as in claim 10, wherein the bottom wall includes stainless steel.

12. The container as claimed in claim 10, wherein the bottom wall includes a pattern tuned to an ultrasonic frequency of the ultrasonic drive.

13. A method of cooking food, comprising the steps of:

(a) providing a basket having an ultrasonically tuned bottom wall on which food is to be positioned;

(b) providing a cooking medium to cook the food;

(c) placing the basket into the cooking medium; and (d) ultrasonically driving the bottom wall of the basket, on which food to be cooked is placed.

* * * * *